US011132841B2

(12) United States Patent
Romea et al.

(10) Patent No.: US 11,132,841 B2
(45) Date of Patent: Sep. 28, 2021

(54) SYSTEMS AND METHODS FOR PRESENTING DIGITAL ASSETS WITHIN ARTIFICIAL ENVIRONMENTS VIA A LOOSELY COUPLED RELOCALIZATION SERVICE AND ASSET MANAGEMENT SERVICE

(71) Applicant: Facebook Technologies, LLC, Menlo Park, CA (US)

(72) Inventors: Alvaro Collet Romea, Seattle, WA (US); Jingming Dong, Seattle, WA (US); Xiaoyang Gao, Palo Alto, CA (US); Jiawen Zhang, Menlo Park, CA (US); Yuheng Ren, Bothell, WA (US); Raul Mur Artal, Redmond, WA (US); Christopher Sweeney, Seattle, WA (US); Jakob Julian Engel, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/205,255

(22) Filed: Nov. 30, 2018

(65) Prior Publication Data

US 2020/0175764 A1   Jun. 4, 2020

(51) Int. Cl.
  *G06T 19/00*   (2011.01)
  *G06T 7/73*   (2017.01)
  *G06F 16/538*   (2019.01)

(52) U.S. Cl.
  CPC .......... *G06T 19/006* (2013.01); *G06F 16/538* (2019.01); *G06T 7/73* (2017.01); *G06T 2207/30244* (2013.01)

(58) Field of Classification Search
  None
  See application file for complete search history.

(56) References Cited

U.S. PATENT DOCUMENTS

| 2002/0075389 | A1* | 6/2002 | Seeger | H04N 5/232 |
| | | | | 348/222.1 |
| 2005/0232466 | A1* | 10/2005 | Kampchen | G06T 7/251 |
| | | | | 382/103 |

(Continued)

FOREIGN PATENT DOCUMENTS

| WO | 2016/051366 A2 | 4/2016 |
| WO | 2020/112161 A1 | 6/2020 |

OTHER PUBLICATIONS

Grauman et al., "Local Features: Detection and Description", Visual Object Recognition, 2011, pp. 11-28.

(Continued)

*Primary Examiner* — Saptarshi Mazumder
(74) *Attorney, Agent, or Firm* — FisherBroyles, LLP

(57) ABSTRACT

The disclosed computer-implemented method may include acquiring, from a client device within a real-world environment, information representative of the real-world environment, and transmitting the information representative of the real-world environment to a relocalization service. The method may further include receiving, from the relocalization service, (1) an anchor point that may include a mapped position within the real-world environment, and (2) a determined position within the real-world environment of a client device relative to the mapped position of the anchor point. The method may further include sending an identifier of the anchor point to an asset management service, and obtaining, from the asset management service, a digital asset. The method may further include presenting the digital asset at a position within an artificial environment relative to the mapped position of the anchor point. Various other methods, systems, and computer-readable media are also disclosed.

20 Claims, 15 Drawing Sheets

(56) References Cited

U.S. PATENT DOCUMENTS

| | | | | |
|---|---|---|---|---|
| 2013/0293530 A1* | 11/2013 | Perez | ............... | G06K 9/00671 |
| | | | | 345/418 |
| 2013/0321403 A1* | 12/2013 | Piemonte | ............... | G06T 15/00 |
| | | | | 345/419 |
| 2016/0027218 A1* | 1/2016 | Salter | ............... | G06F 3/012 |
| | | | | 345/633 |
| 2018/0158156 A1* | 6/2018 | Dintenfass | ............ | G06Q 50/16 |
| 2018/0285052 A1* | 10/2018 | Eade | .............. | G06F 3/1454 |

OTHER PUBLICATIONS

Whitehead et al., "Estimating Intrinsic Camera Parameters from the Fundamental Matrix Using an Evolutionary Approach", EURASIP Journal on Applied Signal Processing, No. 8, 2004, 18 pages.

Sato et al., "Camera position and posture estimation from still image using feature landmark database", SICE Annual Conference, Aug. 20-22, 2008, pp. 1514-1519.

Chien et al., "When to Use What Feature? SIFT, SURF, ORB, or A-KAZE Features for Monocular Visual Odometry", International Conference on Image and Vision Computing, IEEE, 2016, 6 pages.

Kazmi et al., "A Survey of 2D and 3D Shape Descriptors", 10th International Conference Computer Graphics, Imaging and Visualization, 2013, pp. 1-10.

Tareen et al., "A Comparative Analysis of SIFT, SURF, KAZE, AKAZE, ORB, and BRISK", International Conference on Computing, Mathematics and Engineering Technologies (iCoMET), IEEE, 2018, 10 pages.

OpenCV., "Camera Calibration and 3D Reconstruction", URL: https://docs.opencv.org/2.4/modules/calib3d/doc/camera_calibration_and_3d_reconstruction.html, as accessed on Apr. 16, 2019, 56 pages.

International Search Report and Written Opinion received for PCT Application Serial No. PCT/US2019/029021 dated Jul. 30, 2019, 11 pages.

Google, "ARCore Cloud Anchors", URL: https://web.archive.org/web/20180526135630/https://codelabs.developers.google.com/codelabs/arcore-cloud-anchors/index.html?index=..%2F..%2Findex#4, May 26, 2018, 5 pages.

Andreasjakl.com, "Basics of AR: Anchors, Keypoints & Feature Detection", URL: https://www.andreasjakl.com/basics-of-ar-anchors-keypoints-feature-detection/, Aug. 6, 2018, pp. 1-14.

Furht, Borko, "Handbook of Augmented Reality", Springer, Aug. 31, 2011, 769 pages.

\* cited by examiner

```
namespace AssetManager
{
    class SingleImageRelocPacket : public Packet
    {
    public:
        uint64_t persistentClientId;

// intrinsics
        float w;
        float h;
        float f;
        float cx;
        float cy;
        float k1;
        float k2;

// raw image data
        int width;
        int height;
        int pitch;
        std::vector<uint8_t> img_data;

// local session's reloc anchor Id
        int localAnchorId;

template <class Archive>
        void serialize(Archive& ar)
        {
            ar(persistentClientId,
                w, h, f, cx, cy, k1, k2,
                width, height, pitch,
                img_data,
                localAnchorID);
        }
    };
}
```
1202

```
namespace AssetManager
{
    class RelocResponsePacket : public Packet
    {
    public:
        uint64_t persistentClientId;

// relative pose kr to query in SE3,
        // rotation in quaternion
        std::vector<float> rotation_q_ca;
        std::vector<float> translation_q_ca;

// basemap cloudAnchor guid
        std::string cloudAnchorGuid;

// local session's reloc anchor Id
        int localAnchorId;

template <class Archive>
        void serialize(Archive& ar)
        {
            ar(persistentClientId, rotation_q_ca,
                translation_q_ca, cloudAnchorGuid,
                localAnchorId);
        }
    };
}
```
1204

```
struct ImageQuery { bool gravity_aligned = false;

union FeaturesAndDescriptors {
    CalibratedImageFeaturesAndDescriptors
      calibrated_image_features_and_descriptors;
    UncalibratedImageFeaturesAndDescriptors
      uncalibrated_image_features_and_descriptors;
    MultiImageFeaturesAndDescriptors
      multi_image_reloc_query;
    MultiImageFeaturesAndDescriptors
      multi_image_unknown_scale_reloc_query;
  };
};
```
1302

```
struct LatLonAlt {
  double latitude_deg;
  double longitude_deg;
  double altitude_meters;

double lat_radius_meters = 0;
  double lon_radius_meters = 0;
  double alt_radius_meters = 0;
};
```
1304

```
struct CoarseGeoLocation {
  LatLonAlt lla;
};
```
1306

```
struct RelocalizationQuery {
  CoarseGeoLocation location;
  ImageQuery image_query;
};
```
1308

```
struct RelocalizationPrior {
  uint64_t prior_reloc_ent_id;
  SE3d T_query_reloc_ent;
};
```
1310

```
struct RelocalizationResponse {
  bool success = false;
  uint64_t localized_ent_id;
  SE3d T_ent_query;
  double scale_ent_query = 1.0;
  double estimated_focal_length;
  int num_inliers = 0;
  std::vector<int> inlier_indices;
};
```
1312

```
class RelocalizationService { virtual RelocalizationResponse relocalize(
    const RelocalizationQuery& query) = 0;

virtual RelocalizationResponse relocalizeWithPrior(
    const RelocalizationQuery& query,
    const RelocalizationPrior& prior) = 0;

};
```

1402 denotes the block of virtual method declarations.

FIG. 14

SYSTEMS AND METHODS FOR PRESENTING DIGITAL ASSETS WITHIN ARTIFICIAL ENVIRONMENTS VIA A LOOSELY COUPLED RELOCALIZATION SERVICE AND ASSET MANAGEMENT SERVICE

BACKGROUND

Augmented reality (AR) systems may superimpose a computer-generated image on a user's view of a real-world environment. For example, when a user views an AR scene of a real-world office, the user may view various real-world objects (e.g., walls, desks, chairs, etc.) that may exist within the real-word office and may also view one or more virtual objects that may appear to be positioned within the real-world office. For example, a virtual object of a document may appear to be laying on top of a real-world desk, a virtual object that represents a remote user may appear to be sitting in a real-world chair, and a virtual informational display may appear to be attached to a real-world wall.

Various conventional AR platforms may provide developers with tools to create AR experiences for users and may enable users to view and/or interact with those AR experiences. Unfortunately, certain features of conventional AR platforms (e.g., storage and/or management of digital assets and/or virtual objects) may be exclusive to execution environments (e.g., computing devices, operating systems, development interfaces, etc.) associated with those conventional AR platforms. Therefore, it may be difficult, cumbersome, or impossible for a device executing one AR platform to access and/or utilize features (e.g., digital assets and/or virtual objects) associated with another AR platform. Hence, it may be difficult for developers to create and provide users with persistent AR experiences across multiple execution environments and/or AR platforms.

SUMMARY

As will be described in greater detail below, the instant disclosure describes various systems and methods for presenting digital assets within artificial environments via a loosely coupled relocalization service and asset management service. In some examples, the systems and methods described herein may provide a loosely coupled relocalization service, asset management service, and client front-end environment that may enable persistent AR experiences across multiple AR platforms.

In one example, a computer-implemented method for presenting digital assets within artificial environments via a loosely coupled relocalization service and asset management service may include acquiring, via a client device within a real-world environment, information representative of the real-world environment, and transmitting the information representative of the real-world environment to a relocalization service. The method may further include receiving, from the relocalization service in response to the information representative of the real-world environment (1) information associated with an anchor point that may include a mapped position within the real-world environment, and (2) a determined position within the real-world environment of the client device relative to the mapped position of the anchor point.

The method may further include (1) sending a query that may include an identifier associated with the anchor point to an asset management service, and (2) obtaining, from the asset management service in response to the query, information representative of at least one digital asset. The method may further include presenting the digital asset at a position within an artificial environment relative to the determined position of the client device within the real-world environment and the mapped position of the anchor point.

In some examples, acquiring the information representative of the real-world environment may include (1) capturing, via an imaging device included in the client device, an image of at least a portion of the real-world environment, and (2) detecting an orientation of the imaging device at a time of capturing the image of the portion of the real-world environment.

In some examples, acquiring the information representative of the real-world environment may further include adjusting, by the client device, the image by reducing an effect of an intrinsic parameter of the imaging device on the image. In at least one example, the intrinsic parameter may include at least one of (1) a focal length of the imaging device, (2) a principal point of the imaging device, or (3) a skew coefficient of the imaging device.

In at least one example, acquiring the information representative of the real-world environment may further include (1) detecting at least one image feature included in the image, (2) generating a feature descriptor based on the image feature included in the image, and (3) including the feature descriptor as at least part of the information representative of the real-world environment.

In some embodiments, acquiring the information representative of the real-world environment may further include identifying, based on the image feature and the orientation of the imaging device at the time of capturing the image, a feature ray that may include (1) an origin at a point associated with the imaging device, and a direction that causes the feature ray to intersect with the image feature. In some examples, acquiring the information representative of the real-world environment may further include including the feature ray as at least part of the information representative of the real-world environment.

In at least some embodiments, the information representative of the real-world environment may include at least one of (1) an image of at least a portion of the real-world environment captured by an imaging device included in the client device, (2) an orientation of the imaging device at a time of capturing the image by the imaging device, (3) an intrinsic parameter of the imaging device, (4) an image feature included in the image, (4) a feature descriptor based on the image feature included in the image, (5) a feature descriptor based on the image feature included in the image, or (6) a feature ray with an origin at a point associated with the imaging device and that intersects the image feature.

In at least one example, the information representative of the real-world environment may further include at least one of (1) a previously determined position of the client device relative to at least one mapped position within the real-world environment, (2) a confidence level associated with the previously determined position of the client device, (3) a global positioning system (GPS) coordinate associated with the client device, or (4) a network identifier associated with the real-world environment.

In some examples, the method may further include tracking a motion of the client device within the real-world environment and updating the determined position within the real-world environment of the client device based on the motion of the client device within the real-world environment. In at least one example, tracking the motion of the client device within the real-world environment may include (1) determining, at a time of transmitting the information representative of the real-world environment to the relocalization service, an initial position of the client device within the real-world environment, (2) generating an additional anchor point that corresponds to the initial position, and (3) tracking the motion of the client device within the real-world environment relative to the additional anchor point.

In at least one embodiment, the method may further include (1) determining a coarse position of the client device based on a part of the information representative of the real-world environment, (2) identifying a fine position of the client device based on the coarse position and an additional part of the information representative of the real-world environment, and (3) selecting the anchor point based on the fine position of the client device.

In addition, a corresponding system for presenting digital assets within artificial environments via a loosely coupled relocalization service and asset management service may include several modules stored in memory, including (1) an acquiring module that acquires, via a client device within a real-world environment, information representative of the real-world environment, and (2) a transmitting module that transmits the information representative of the real-world environment to a relocalization service. The system may further include a receiving module that receives, from the relocalization service in response to the information representative of the real-world environment, (1) information associated with an anchor point may include a mapped position within the real-world environment, and (2) a determined position within the real-world environment of the client device relative to the mapped position of the anchor point.

The system may further include a sending module that sends a query that may include an identifier associated with the anchor point to an asset management service, and an obtaining module that obtains, from the asset management service in response to the query, information representative of at least one digital asset. The system may further include a presenting module that presents the digital asset at a position within an artificial environment relative to the determined position of the client device within the real-world environment and the mapped position of the anchor point. The system may also include at least one physical processor that executes the acquiring module, the transmitting module, the receiving module, the sending module, the obtaining module, and the presenting module.

In some examples, the acquiring module may acquire the information representative of the real-world environment by (1) capturing, via an imaging device included in the client device, an image of at least a portion of the real-world environment, and (2) detecting an orientation of the imaging device at a time of capturing the image of the portion of the real-world environment.

In some embodiments, the acquiring module may further acquire the information representative of the real-world environment by adjusting the image by reducing an effect of an intrinsic parameter of the imaging device on the image. In further embodiments, the acquiring module may further acquire the information representative of the real-world environment by (1) detecting at least one image feature included in the image, (2) generating a feature descriptor based on the image feature included in the image, and (3) including the feature descriptor as at least part of the information representative of the real-world environment In at least one embodiment, the acquiring module may further acquire the information representative of the real-world environment by identifying, based on the image feature and the orientation of the imaging device at the time of capturing the image, a feature ray that may include (1) an origin at a point associated with the imaging device, and (2) a direction that causes the feature ray to intersect with the image feature. In some examples, the acquiring module may further acquire the information representative of the real-world environment by including the feature ray as at least part of the information representative of the real-world environment.

In at least one example, the system may further include a tracking module that tracks a motion of the client device within the real-world environment and updates the determined position within the real-world environment of the client device based on the motion of the client device within the real-world environment. In at least one example, the physical processor may further execute the tracking module.

In at least one embodiment, the tracking module may further track the motion of the client device within the real-world environment by (1) determining, at a time of transmitting the information representative of the real-world environment to the relocalization service, an initial position of the client device within the real-world environment, (2) generating an additional anchor point that corresponds to the initial position, and (3) tracking the motion of the client device within the real-world environment relative to the additional anchor point.

In some examples, the system may further include a positioning module, stored in memory, that determines a coarse position of the client device based on a part of the information representative of the real-world environment. The positioning module may further identify a fine position of the client device based on the coarse position and an additional part of the information representative of the real-world environment and may further select the anchor point based on the fine position of the client device. In some examples, the physical processor may further execute the positioning module.

In some examples, the above-described method may be encoded as computer-readable instructions on a computer-readable medium. For example, a computer-readable medium may include one or more computer-executable instructions that, when executed by at least one processor of a computing device, may cause the computing device to acquire, via a client device within a real-world environment, information representative of the real-world environment, and transmit the information representative of the real-world environment to a relocalization service. The computer-readable medium may further include one or more computer-executable instructions that, when executed by at least one processor of the computing device, may cause the computing device to receive, from the relocalization service in response to the information representative of the real-world environment, (1) information associated with an anchor point that may include a mapped position within the real-world environment, and (2) a determined position within the real-world environment of the client device relative to the mapped position of the anchor point.

The computer-readable medium may further include one or more computer-executable instructions that, when executed by at least one processor of the computing device, may cause the computing device to (1) send a query that may include an identifier associated with the anchor point to an asset management service, and (2) obtain, from the asset management service in response to the query, information representative of at least one digital asset. The computer-readable medium may further include one or more computer-executable instructions that, when executed by at least one processor of the computing device, may cause the computing device to present the digital asset at a position within an artificial environment relative to the determined position of the client device within the real-world environment and the mapped position of the anchor point.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 12-15 include listings of computer code that may, when executed by at least one processor of a computing device, cause the computing device to present digital assets within an artificial environment in accordance with the systems and methods described herein.

Figure 1:
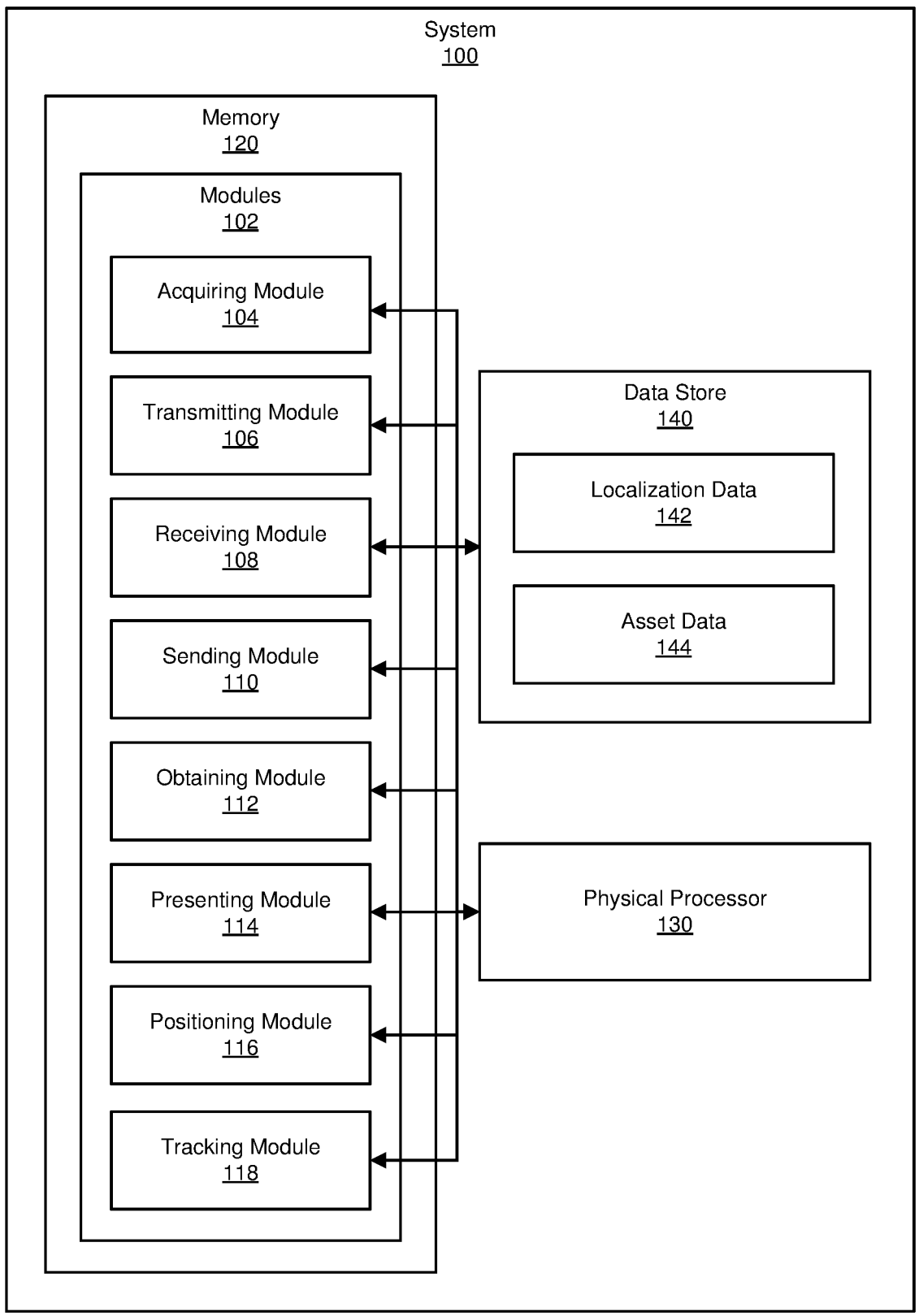
FIG. 1 is a block diagram of an example system for presenting digital assets within artificial environments via a loosely coupled relocalization service and asset management service.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for presenting digital assets within artificial environments via a loosely coupled relocalization service and asset management service. As will be explained in greater detail below, embodiments of the instant disclosure may acquire, via a client device within a real-world environment, information representative of the real-world environment, such as an image of the real-world environment, a current orientation of the client device, a GPS coordinate of the client device, and so forth. An embodiment may also transmit the acquired information to a relocalization service.

An embodiment may also receive, from the relocalization service in response to the information representative of the real-world environment, information associated with an anchor point, such as an identifier associated with the anchor point. As will be described in greater detail below, an anchor point may include and/or may be associated with a mapped position within a real-world environment. An embodiment may also receive, in response to the acquired information representative of the real-world environment, a determined position within the real-world environment of the client device relative to the mapped position of the anchor point. Based on this information, an embodiment may relocalize the client device within the real-world environment.

An embodiment may also send a query that may include an identifier associated with the anchor point to an asset management service, and may obtain, in response to the query, information representative of at least one digital asset such as a virtual object. An embodiment may also present the digital asset at a position within an artificial environment, such as an AR environment or a virtual reality (VR) environment, relative to the determined position of the client device within the real-world environment and the mapped position of the anchor point.

In some embodiments, the systems and methods described herein may provide a loosely coupled relocalization service, asset management service, and client front end for presenting persistent AR experiences across multiple AR platforms. In some examples, "loosely coupled" systems may generally include a plurality of components where each component may have few or no dependencies on other components of the system. For example, a relocalization service, asset management service, and client front end as described herein may be loosely coupled in that the relocalization service and the asset management service may maintain little to no information (e.g., state information) regarding client front-end devices.

Additionally, a relocalization service, asset management service, and client front end as described herein may be loosely coupled in that each component may communicate asynchronously with the other components substantially via self-contained queries and responses. Additionally, in some examples, the relocalization service and asset management service may communicate with each other minimally and indirectly via discrete anchor point identifiers received by client devices from the relocalization service and sent from the client devices to the asset management service.

This loosely coupled architecture may enable each component (e.g., relocalization service, asset management service, and client front end) to operate and/or develop independently of the others. Moreover, this loosely coupled architecture may enable the relocalization service and/or asset management service to serve multiple types of applications, such as any service that may provide efficient delivery of location-relevant data to client devices. Hence, some embodiments of the instant disclosure may provide increased flexibility when compared with traditional relocalization and/or asset management systems.

Furthermore, the systems and methods described herein may enable developers to create persistent, cross-platform AR experiences that may be experienced, accessed, viewed, and/or enjoyed via any of a variety of suitable client devices employing any of a number of suitable front-end environments. Client devices employing any suitable front-end environment may utilize a relocalization service and/or an asset management service as described herein to present digital assets within artificial environments.

For example, embodiments of the systems and methods described herein may enable a first user, via a first client device executing a first AR platform, to place and/or view a digital asset (e.g., a virtual flower) at a position within an AR environment that corresponds to a position within a real-world environment (e.g., on a table). A second user may then, via a second client device employing a second AR platform, locate, view, experience, and/or interact with the digital asset within the AR environment.

In addition, embodiments of the instant disclosure may provide for a more efficient usage of telecommunications resources (e.g., bandwidth) and/or computing resources than traditional tightly coupled relocalization, asset management, and front-end augmented reality options. For example, as will be described in greater detail below, relocalizing a client device within a real-world environment may require and/or use only a small amount of bandwidth but may require and/or use a relatively high amount of computing resources (e.g., processing resources, memory resources, etc.). However, retrieving an asset from an asset management service may require and/or use a relatively high amount of bandwidth, but only a small amount of computing resources. By employing a loose coupling rather than a tight coupling between a client device, a relocalization service, and an asset management service, the systems and methods described herein may more efficiently allocate and/or use telecommunications resources (e.g., bandwidth) and/or computing resources than conventional AR options.

The following will provide, with reference to FIGS. 1-2 and 4-11, detailed descriptions of systems for presenting digital assets within artificial environments via a loosely coupled relocalization service and asset management service. Detailed descriptions of corresponding computer-implemented methods will also be provided in connection with FIG. 3. Detailed descriptions of computer code that may, when executed by one or more processors of a computing device, cause the computing device to perform one or more of the computer-implemented methods described herein will also be provided in connection with FIGS. 12-15.

FIG. 1 is a block diagram of an example system 100 ("system 100") for presenting digital assets within artificial environments via a loosely coupled relocalization service and asset management service. As illustrated in this figure, example system 100 may include one or more modules 102 for performing one or more tasks. As will be explained in greater detail below, modules 102 may include an acquiring module 104 that acquires, via a client device within a real-world environment, information representative of the real-world environment. As further shown in FIG. 1, system 100 may further include (e.g., as part of modules 102) a transmitting module 106 that transmits the information representative of the real-world environment to a relocalization service, and a receiving module 108 that receives, from the relocalization service in response to the information representative of the real-world environment, (1) information associated with an anchor point that may include a mapped position within the real-world environment, and (2) a determined position within the real-world environment of the client device relative to the mapped position of the anchor point.

As further shown in FIG. 1, system 100 may also include (e.g., as part of modules 102) a sending module 110 that sends a query that may include an identifier associated with the anchor point to an asset management service, and an obtaining module 112 that obtains, from the asset management service in response to the query, information representative of at least one digital asset. As also shown in FIG. 1, system 100 may further include (e.g., as part of modules 102) a presenting module 114 that presents the digital asset at a position within an artificial environment relative to the determined position of the client device within the real-world environment and the mapped position of the anchor point.

In some embodiments, as also shown in FIG. 1, system 100 may further include (e.g., as part of modules 102) a positioning module 116 that (1) determines a coarse position of the client device based on a part of the information representative of the real-world environment, and (2) identifies a fine position of the client device based on the coarse position and an additional part of the information representative of the real-world environment. In some examples, positioning module 116 may also select an anchor point based on the fine position of the client device.

As further shown in FIG. 1, in some embodiments, system 100 may further include (e.g., as part of modules 102) a tracking module 118 that tracks a motion of the client device within the real-world environment and updates the determined position within the real-world environment of the client device based on the motion of the client device within the real-world environment.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 may generally represent any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate presenting digital assets within artificial environments via a loosely coupled relocalization service and asset management service. Examples of physical processor 130 include, without limitation, microprocessors, microcontrollers, central processing units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As also shown in FIG. 1, example system 100 may also include one or more data stores, such as data store 140, that may receive, store, and/or maintain data. Data Store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a NoSQL database, a NewSQL database, and/or any other suitable organized collection of data.

In at least one example, data store 140 may include localization data 142 and/or asset data 144. As will be explained in greater detail below, in some examples, localization data 142 may include any information that a relocalization service may use to identify, calculate, detect, and/or otherwise determine a position of at least one client device within a real-world environment including, without limitation, a pre-generated and/or dynamically generated map of a real-world environment, data associated with one or more mapped positions within a real-world environment, data associated with relationships between and/or among mapped positions within the real-world environment, and so forth. Additionally, asset data 144 may include any suitable data associated with assets (e.g., digital assets) that may be presented within an artificial environment including, without limitation, digital assets, virtual objects, two-dimensional models, three-dimensional models, animation and/or movement data associated with an asset, audiovisual data, data associated with relationships between and/or among assets, data associated with relationships between digital assets and mapped positions within a real-world environment, relative translations and/or transformations from mapped positions to digital assets, relative translations and/or transformations from to digital assets to mapped positions, and so forth.

Figure 2:
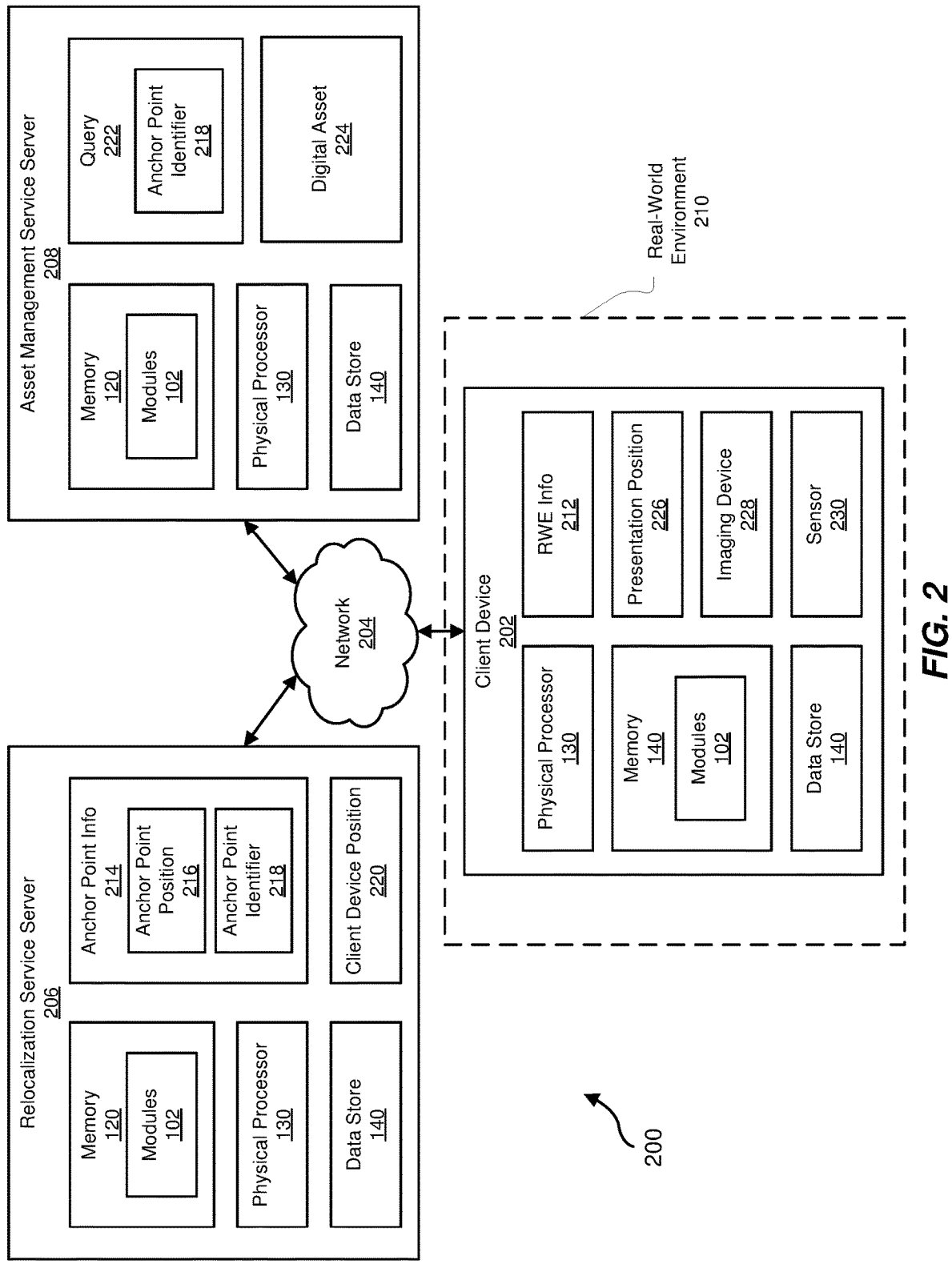
FIG. 2 is a block diagram of an example implementation of a system for presenting digital assets within artificial environments via a loosely coupled relocalization service and asset management service.

Example system 100 in FIG. 1 may be implemented in a variety of ways. For example, all or a portion of example system 100 may represent portions of an example system 200 ("system 200") in FIG. 2. As shown in FIG. 2, system 200 may include a client device 202 in communication with a relocalization service server 206 (also "RLS server 206" in FIG. 2 and herein) and an asset management service server 208 (also "AMS server 208" in FIG. 2 and herein) via network 204. In at least one example, client device 202 may be programmed with one or more of modules 102. Additionally or alternatively, RLS server 206 and/or AMS server 208 may be programmed with one or more of modules 102.

In at least one embodiment, one or more modules 102 from FIG. 1 may, when executed by client device 202, RLS server 206, and/or AMS server 208, enable client device 202, RLS server 206, and/or AMS server 208 to perform one or more operations to present digital assets within an artificial environment via a loosely coupled relocalization service and asset management service. For example, as will be described in greater detail below, acquiring module 104 may cause client device 202, RLS server 206, and/or AMS server 208 to acquire, via a client device (e.g., client device 202) within a real-world environment (e.g., real-world environment 210), information representative of the real-world environment (e.g., real-world environment information 212, also "RWE info 212" in FIG. 2).

In some examples, acquiring module 104 may cause client device 202, RLS server 206, and/or AMS server 208 to acquire the information representative of the real-world environment (e.g., real-world environment information 212) by (1) capturing, via an imaging device included in the client device (e.g., imaging device 228), an image of at least a portion of the real-world environment, and (2) detecting an orientation of the imaging device (e.g., via a sensor 230) at a time of capturing the image of the portion of the real-world environment. In some examples, the image and/or the orientation may be included in the information representative of the real-world environment.

In at least some examples, transmitting module 106 may cause client device 202, RLS server 206, and/or AMS server 208 to transmit the information representative of a real-world environment (e.g., real-world environment information 212) to a relocalization service (e.g., RLS server 206). Receiving module 108 may also cause client device 202, RLS server 206, and/or AMS server 208 to receive, from the relocalization service (e.g., RLS server 206) in response to the information representative of the real-world environment, information associated with an anchor point (e.g., anchor point information 214, also "anchor point info 214" in FIG. 2) that may include a mapped position within the real-world environment (e.g., anchor point position 216). In some examples, receiving module 108 may also cause client device 202, RLS server 206, and/or AMS server 208 to receive a determined position within the real-world environment of the client device (e.g., client device position 220) relative to the mapped position of the anchor point (e.g., relative to anchor point position 216).

In some embodiments, sending module 110 may cause client device 202, RLS server 206, and/or AMS server 208 to send a query (e.g., query 222) that may include an identifier associated with the anchor point (e.g., anchor point identifier 218) to an asset management service (e.g., AMS server 208). In at least one embodiment, obtaining module 112 may cause client device 202, RLS server 206, and/or AMS server 208 to obtain, from the asset management service (e.g., AMS server 208) in response to the query, information representative of at least one digital asset (e.g., digital asset 224).

In one example, presenting module 114 may cause client device 202, RLS server 206, and/or AMS server 208 to present the digital asset (e.g., digital asset 224) at a position within an artificial environment (e.g., presentation position 226) relative to the determined position of the client device within the real-world environment (e.g., client device position 220) and the mapped position of the anchor point (e.g., anchor point position 216).

In some examples, a "position" may include a location and/or an orientation within an environment relative to a particular frame of reference. Additionally, in some examples, a "frame of reference" may include a set of criteria and/or definitions that may express and/or define relationships between different locations, positions, orientations, and/or poses within an environment, such as a system of coordinate axes in relation to which size, location, position, orientation, pose, and/or motion may be defined. Furthermore, in some examples, a position may be expressed in terms of six degrees of freedom (6DoF) that may describe movement of a rigid body in three-dimensional space relative to a particular frame of reference, such as translation in three perpendicular axes (e.g., forward/backward, up/down, and left/right) and rotation about three perpendicular axes (e.g., yaw, pitch, and roll).

Furthermore, in some examples, a "pose" may include a position, location, and/or an orientation of an object (e.g., an anchor point, a client device, a digital asset, a real-world object, a virtual object, etc.) relative to a particular point of reference within an environment, such as a real-world environment, an artificial environment (e.g., an augmented reality environment or a virtual reality environment), a map of a real-world environment, and so forth. For example, a "pose of an anchor point" may refer to a location and/or an orientation of the anchor point within a real-world environment, a map of a real-world environment, and/or an artificial environment. As another example, a "pose of a client device" may refer to a location and/or an orientation of the client device within a real-world environment and/or an artificial environment. Additionally, a "pose of a digital asset" may refer to a location and an orientation of the digital asset within an artificial environment. In some examples, a location, orientation, position, pose, and/or frame of reference may be expressed in relation to another location, orientation, position, pose, and/or frame of reference.

Locations, orientations, positions, poses, transformations, and/or motions may be expressed in any suitable way within a frame of reference, such as via coordinates, points, angles, vectors, paths, and so forth. In some examples, orientations, rotations, and/or relative orientations may be expressed as one or more of an axis-angle representation, Euler angles, a unit vector and axis, a Euclidean rotation vector, a rotation group, a special orthogonal group (e.g., an SO(3) rotational group), a special Euclidean group (e.g., an SE(3) Euclidean group), one or more quaternions, variations or combinations of one or more of the same, and so forth.

As will be described in greater detail below in reference to FIG. 7, in some examples, an "anchor point" may include and/or correspond to an identifiable mapped position within a real-world environment (e.g., anchor point position 216). Likewise, a "mapped position," "anchor point position" and/or a "mapped position within a real-world environment" may include a pre-selected two- or three-dimensional position within a pre-generated map of a real-world environment (e.g., real-world environment 210) that may be associated with an anchor point. In some examples, an anchor point may also be referred to as a "trackable" and/or a "keyrig" herein.

Anchor points may be selected, identified, determined, generated, and/or located via a preliminary mapping process that may generate a map of a real-world environment. In some examples, such a preliminary mapping process may have a relatively high accuracy and may therefore produce high quality maps and/or accurately positioned anchor points that may be useful for localization and/or relocalization of client devices. Additionally, in some examples, anchor points may be manually selected and/or inserted into a map by a developer and/or user of one or more of the systems described herein.

In some examples, anchor points may be associated with features of a real-world environment that may be consistently identified across AR sessions and/or that may be relatively static within the real-world environment. For example, an anchor point may be associated with a table in an office, which may not be moved frequently, rather than a chair in an office, which may be moved frequently. Hence, in some examples, an anchor point may represent a known, identified, and/or determined position within the real-world environment, and may be used to relocalize a client device and/or to present a digital asset within an AR scene.

In some examples, an anchor point may be associated with one or more digital assets, such that a digital asset associated with the anchor point may be positioned within an artificial environment by reference to the mapped position of the anchor point. For example, assuming a Cartesian coordinate system with an origin at a mapped position associated with an anchor point, a digital asset may be "anchored" to the anchor point at a point 1 meter along an x-axis, −2 meters along a y-axis, and 3 meters along a z-axis. In some examples, the digital asset may also include a rotation relative to an orientation of the anchor point, such as a pitch angle of 1.2°, a yaw angle of −23°, and a roll angle of 78°.

Thus, continuing with the above example, when one or more of the systems described herein (e.g., presenting module 114) presents a digital asset within an artificial environment, one or more of the systems described herein (e.g., presenting module 114) may determine a position within the artificial environment, relative to the mapped position of the anchor point as translated to a frame of reference of the artificial environment, that may be 1 meter along an x-axis from the anchor point, −2 meters along a y-axis from the anchor point, 3 meters along a z-axis from the anchor point, and oriented (e.g., rotated) relative to an orientation of the anchor point. One or more of the systems described herein (e.g., presenting module 114) may then present the digital asset at the determined position within the artificial environment. Hence, when the user views the artificial environment composited with a corresponding view of the real-world environment, the digital asset may appear to be positioned at the determined position within the real-world environment. Additional examples and explanations will be provided below in reference to FIGS. 7-11.

Client device 202 generally represents any type or form of computing device capable of reading and/or executing computer-executable instructions. In at least one embodiment, client device 202 may accept one or more directions from RLS server 206 and/or AMS server 208. Examples of client device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In some examples, client device 202 may include and/or may implement a front end of an AR platform.

In some embodiments, client device 202 may further include an imaging device, such as imaging device 228. Imaging device 228 may include any suitable imaging device that may gather (e.g., observe, view, receive, locate, identify etc.) imaging information associated with a real-world environment (e.g., real-world environment 210). For example, imaging device 228 may include, without limitation, a visible-light imaging device, an infrared imaging device, a thermal imaging device, a radar sensor, a combination of one or more of the same, and so forth.

In at least one embodiment, imaging device 228 may include an image sensor (e.g., a camera), such that at least some signals captured by imaging device 228 may include two-dimensional imaging information (e.g., imaging information having no depth information). In some embodiments, client device 202 may transmit corresponding imaging information (e.g., as part of real-world environment information 212) to another device, such as RLS server 206, which may use the imaging information from imaging device 228 to determine a position of client device 202 (e.g., client device position 220) within real-world environment 210.

In at least some examples, client device 202 may further include a sensor, such as sensor 230. Sensor 230 may include any suitable sensor that may gather (e.g., observe, view, receive, locate, identify, store, etc.) information associated with a real-world environment (e.g., real-world environment information 212). For example, sensor 230 may include, without limitation, a proximity sensor, a depth sensor, a temperature sensor, an orientation sensor, an accelerometer, a radar sensor, a sonar sensor, a compass, a GPS device, an inertial measurement unit (IMU), a combination of one or more of the same, and so forth. In at least one example, sensor 230 may be included in a plurality of sensors included in and/or otherwise in communication with an image-based tracking system and/or a relocalization service (e.g., RLS server 206). In some examples, client device 202 may transmit sensor data (e.g., as part of real-world environment information 212) to another device, such as RLS server 206, which may use image data from imaging device 228 and/or sensor data from sensor 230 to identify, detect, acquire, and/or determine a position of client device 202 (e.g., client device position 220).

In some examples, although not shown in FIG. 2, client device 202 may include, generate, update, maintain, host, and/or access a local map of at least a portion of a real-world environment (e.g., a portion of real-world environment 210). In some examples, client device 202 may generate and/or update the local map and/or may track a location of client device 202 within the real-world environment via any suitable technique, such as one or more inertial navigation, computer vision, and/or simultaneous localization and mapping (SLAM) techniques.

Network 204 generally represents any medium or architecture capable of facilitating communication and/or data transfer between client device 202, RLS server 206, and/or AMS server 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, proprietary connections, and the like. Network 204 may facilitate communication or data transfer using wireless or wired connections. In one embodiment, network 204 may facilitate communication between client device 202, RLS server 206, and AMS server 208.

RLS server 206 generally represents any type or form of computing device capable of reading and/or executing computer-executable instructions and/or hosting executables. Examples of RLS server 206 include, without limitation, application servers, storage servers, database servers, web servers, and/or any other suitable computing device configured to run certain software applications and/or provide various application, storage, and/or database services.

In some examples, RLS server 206 may provide a relocalization service. In some examples, "relocalization" may include any process that determines and/or identifies a position, location, and/or orientation of an object, such as a computing device (e.g., client device 202), within a particular frame of reference. Hence, in some examples, a "relocalization service" may include any computer-provided service that, when provided with suitable information associated with a real-world environment (e.g., real-world environment information 212), may determine and/or identify a position, location, and/or orientation within the real-world environment based on the information associated with the real-world environment.

In some examples, a relocalization service may also identify one or more anchor points mapped to locations within the real-world environment, and may provide a position, location, and/or orientation of the identified anchor point to the client device and/or AMS server 208. In further examples, a relocalization service may provide a position within a real-world environment relative to an anchor point. For example, as will be described in greater detail below, when a relocalization service is provided with an image of a real-world environment captured by an imaging device, the relocalization service may identify a position of an imaging device that captured the image at the time that the imaging device captured the image.

Like client device 202, AMS server 208 generally represents any type or form of computing device capable of reading and/or executing computer-executable instructions. In at least one embodiment, AMS server 208 may accept one or more directions from client device 202 and/or RLS server 206. Examples of AMS server 208 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

In at least one example, AMS server 208 may provide an asset management service. In some examples, an "asset management service" may include any computer-provided service that, when a computing device (e.g., RLS server 206, client device 202, etc.) provides the service with suitable information associated with an anchor point (e.g., anchor point identifier 218), the service may identify one or more digital assets and/or may provide the one or more digital assets to the client device. In some examples, a "digital asset" (also referred to herein in some examples as a "virtual object") may include, without limitation, any data, information, instruction, model, object, and/or resource that may be associated with a position within a real-world environment.

For example, a digital asset may include a two- or three-dimensional graphical object or model (such as a virtual flower, as mentioned above) that a suitable front-end client device (e.g., client device 202) may present (e.g., display) at a position within an artificial environment that corresponds to a position within a real-world environment. In additional or alternative examples, a digital asset may include an audio resource (e.g., a digital audio file) that a suitable front-end client device (e.g., client device 202) may present (e.g., play) at a position within an artificial environment that corresponds to a position within a real-world environment. For example, suppose a user is using a front-end device (e.g., client device 202) to interact with an AR guide application as he or she tours a museum. A digital asset may include an audio file that describes biographical details of an artist who produced a work of art. As the user views the work of art via the AR guide application, the front-end device may present (e.g., play) the audio file.

As a further example, a digital asset may include an instruction that may cause a front-end client device (e.g., client device 202) to perform one or more actions based on a real-world position of the front-end device. To illustrate, suppose a user is using a front-end client device (e.g., client device 202) to play an AR scavenger hunt game. The game may require the user to find a designated room within a building. A digital asset may include an instruction that may cause the front-end client device to shade a view of an artificial environment red when client device 202 is facing towards the designated room and blue when client device 202 is facing away from the designated room.

Additionally, in some examples, a digital asset may, as described above, be associated with (e.g., "attached to") an anchor point. Hence, when a client provides an asset management service with suitable information associated with an anchor point (e.g., anchor point identifier 218), the asset management service may identify and/or provide the client with one or more digital assets associated with the anchor point.

In at least one example, client device 202, RLS server 206, and AMS server 208 may be computing devices programmed with one or more of modules 102. All or a portion of the functionality of modules 102 may be performed by client device 202, RLS server 206, AMS server 208, and/or any other suitable computing system. As will be described in greater detail below, one or more of modules 102 from FIG. 1 may, when executed by at least one processor of client device 202, RLS server 206, and/or AMS server 208, enable client device 202, RLS server 206, and/or AMS server 208 to present digital assets within artificial environments via a loosely coupled relocalization service and asset management service.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
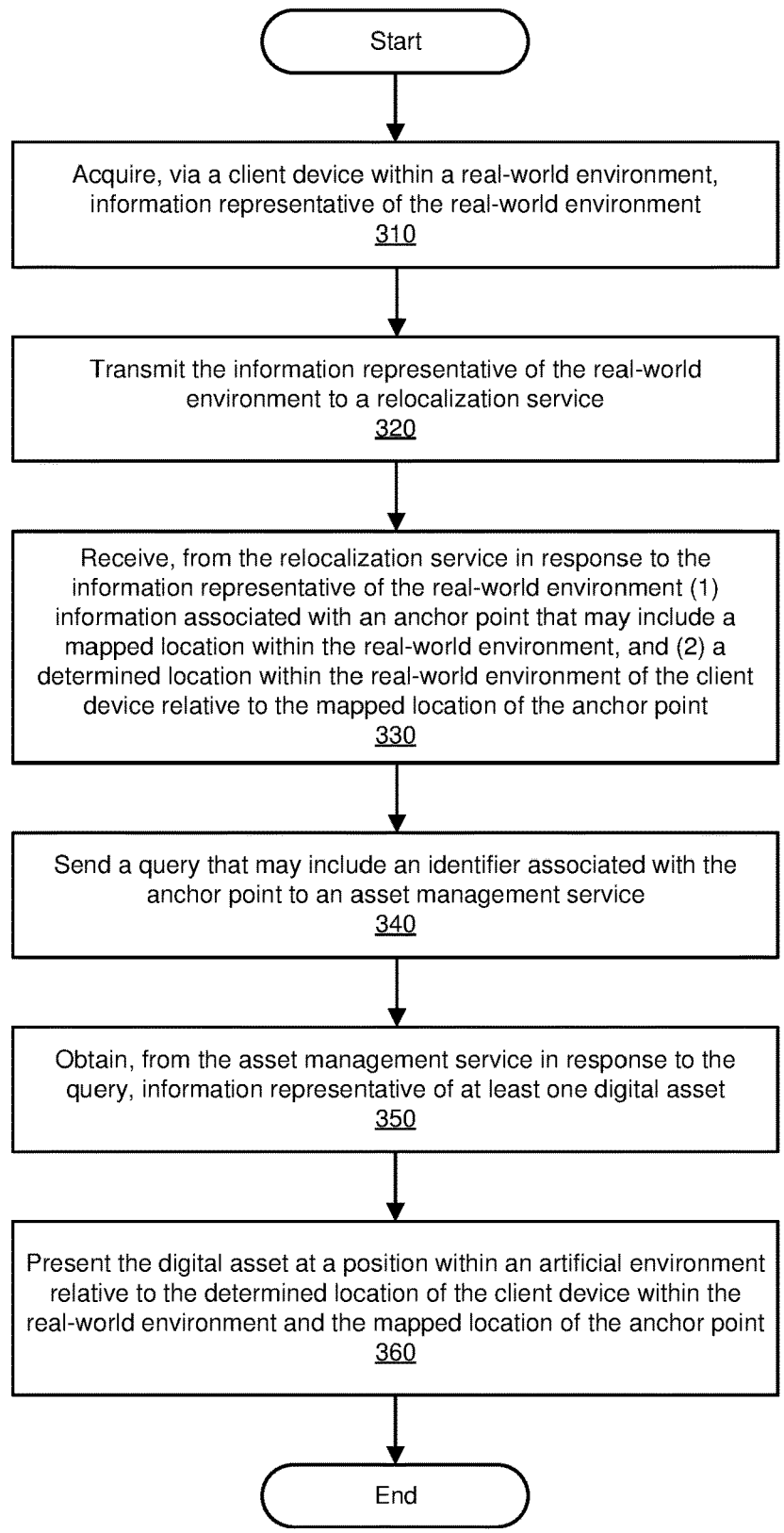
FIG. 3 is a flow diagram of an example method for presenting digital assets within artificial environments via a loosely coupled relocalization service and asset management service.

FIG. 3 is a flow diagram of an example computer-implemented method 300 for presenting digital assets within artificial environments via a loosely coupled relocalization service and asset management service. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may acquire, via a client device within a real-world environment, information representative of the real-world environment. For example, acquiring module 104 may acquire, as part of client device 202, RLS server 206, and/or AMS server 208 in FIG. 2, via client device 202 within real-world environment 210, real-world environment information 212.

In some examples, "information representative of a real-world environment" may include any information that may be associated with one or more characteristics of a particular real-world environment. For example, as will be described in greater detail below, information representative of a real-world environment may include, without limitation, an image of at least a portion of the real-world environment captured by an imaging device included in the client device, an orientation of the imaging device at a time of capturing the image by the imaging device, an intrinsic parameter of the imaging device, an image feature included in the image, a feature descriptor based on the image feature included in the image, a feature ray with an origin at a point associated with the imaging device, a previously determined position of the client device relative to at least one mapped position within the real-world environment, a confidence level associated with the previously determined position of the client device, a GPS coordinate associated with the client device, a network identifier associated with the real-world environment, variations or combinations of one or more of the same, and so forth.

Acquiring module 104 may acquire, via a client device within a real-world environment, information representative of the real-world environment in a variety of contexts. For example, acquiring module 104 may acquire real-world environment information 212 by capturing, via imaging device 228, an image of at least a portion of the real-world environment.

Figure 4:
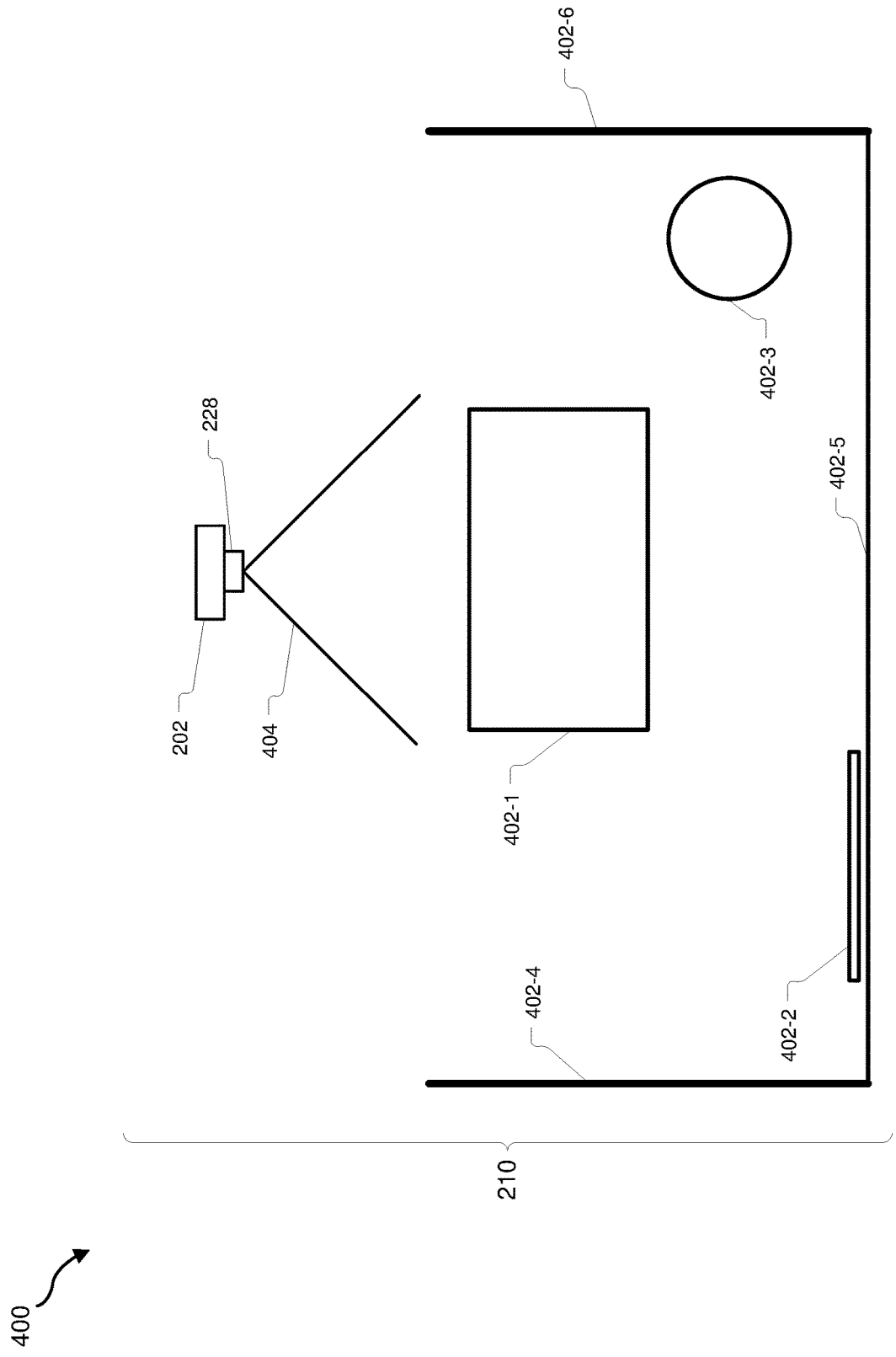
FIG. 4 is an overhead view of a real-world environment and a client device positioned within the real-world environment.

By way of illustration, FIG. 4 includes an overhead view 400 of a real-world environment (e.g., real-world environment 210). As shown, imaging device 228, included in client device 202, is oriented toward real-world environment 210. Real-world environment 210 includes various real-world environment objects 402 (i.e., real-world environment objects 402-1 through 402-6). For example, real-world environment object 402-1 may be a desk, real-world environment object 402-2 may be a hanging picture, real-world environment object 404-3 may be a plant, and real-world environment objects 402-4 through 402-7 may be a west wall, a south wall, and an east wall, respectively. Imaging device 228 may have an associated field-of-view 404 that may indicate a portion of real-world environment 210 that imaging device 228 may capture.

Figure 5:
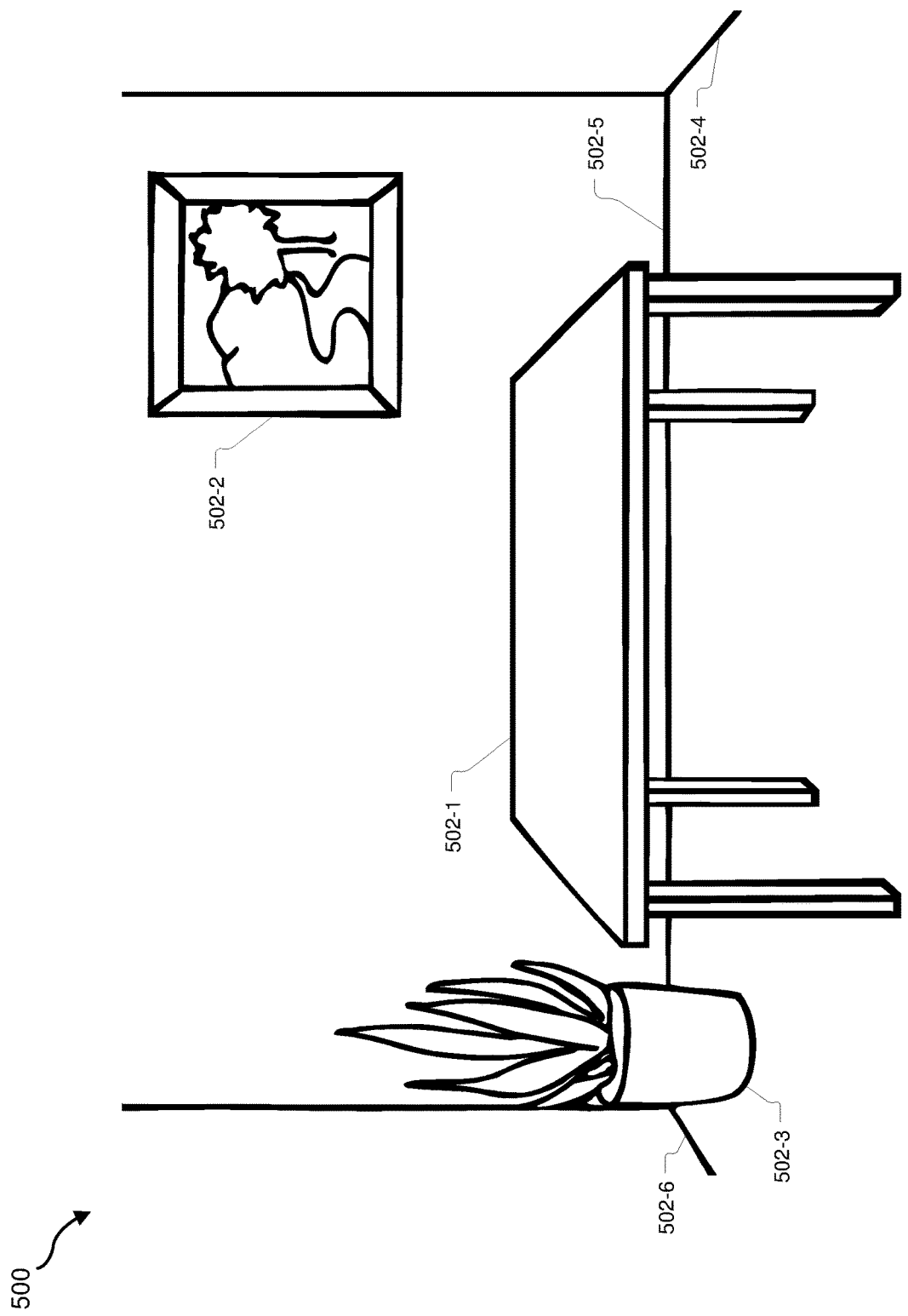
FIG. 5 illustrates information representative of a real-world environment that includes an image of a real-world environment.

FIG. 5 illustrates an image 500 of real-world environment 210 that may be captured by imaging device 228 in the scenario illustrated in FIG. 4. As shown, image 500 includes various image elements 502 (e.g., image elements 502-1 to 502-6) that may correspond to real-world environment objects 402. For example, image element 502-1 may correspond to real-world object 402-1, image element 502-2 may correspond to real-world environment object 402-2, and so forth. In some examples, acquiring module 104 may acquire real-world environment information 212 by capturing, via imaging device 228, an image of at least a portion of real-world environment 210, such as image 500. In at least one example, acquiring module 104 may include the captured image as at least part of real-world environment information 212.

Additionally, acquiring module 104 may acquire real-world environment information 212 by detecting an orientation of the imaging device at a time of capturing the image of the portion of the real-world environment. For example, acquiring module 104 may detect (e.g., via sensor 230) an orientation of imaging device 228 at a time that imaging device 228 captures an image of real-world environment 210 (e.g., image 500). Acquiring module 104 may then include the detected orientation as part of real-world environment information 212.

In some examples, acquiring module 104 may cause client device 202 to perform one or more processes on a captured image, and may then include a result of processing of the image as part of real-world environment information 212 instead of, or in addition to, the captured image. For example, acquiring module 104 may acquire real-world environment information 212 by causing client device 202, RLS server 206, and/or AMS server 208 to adjust an image captured by imaging device 228 by reducing an effect of an intrinsic parameter of the imaging device on the image. Reducing and/or removing an effect of one or more intrinsic parameters on an image may reduce and/or remove one or more forms of distortion (e.g., lens distortion) from the image.

In some examples, an "intrinsic parameter" and/or "an intrinsic parameter of an imaging device" may include any value that may describe a characteristic of an imaging device (e.g., imaging device 228) including, without limitation, physical characteristics, optical characteristics, geometric characteristics, and/or digital characteristics. Examples of intrinsic parameters may include, without limitation, a focal length of an imaging device, a principal point of the imaging device, a skew coefficient of the imaging device, a geometric distortion introduced by a lens of the imaging device, and so forth.

In some examples, acquiring module 104 may determine and/or estimate one or more intrinsic parameters associated with an imaging device via a calibration process (e.g., a geometric camera calibration process). In additional examples, acquiring module 104 may access data representative of one or more predetermined intrinsic parameters of the imaging device, and/or may estimate one or more intrinsic parameters of the imaging device (e.g., a focal length of the imaging device).

In additional examples, acquiring module 104 may further acquire real-world environment information 212 by detecting at least one image feature included in the image, and generating a feature descriptor based on the image feature included in the image. In some examples, an "image feature," "keypoint," "key location," and/or "interest point" may include any identifiable portion of an image that includes information that may be relevant for a computer vision and/or relocalization process, and/or that may be identified as an image feature by at least one feature detection algorithm. In some examples, an image feature may include specific structures included in and/or identified based on pixel data included in an image, such as points, edges, lines, junctions, or objects. Additionally or alternatively, an image feature may be described in terms of properties of a region of an image (e.g., a "blob"), a boundary between such regions, and/or may include a result of a feature detection algorithm applied to the image.

Examples of feature detection algorithms may include, without limitation, Harris corner detection, Features From Accelerated Segment Test (FAST), Laplacian of Gaussian, Difference of Gaussians, Determinant of Hessian, Maximally Stable Extremal Regions (MSER), Principal Curvature-Based Region Detector (PCBR), Gradient Location and Orientation Histogram (GLOH), intensity-based detectors, structure-based detectors, variations or combinations of one or more of the same, and so forth.

Figure 6:
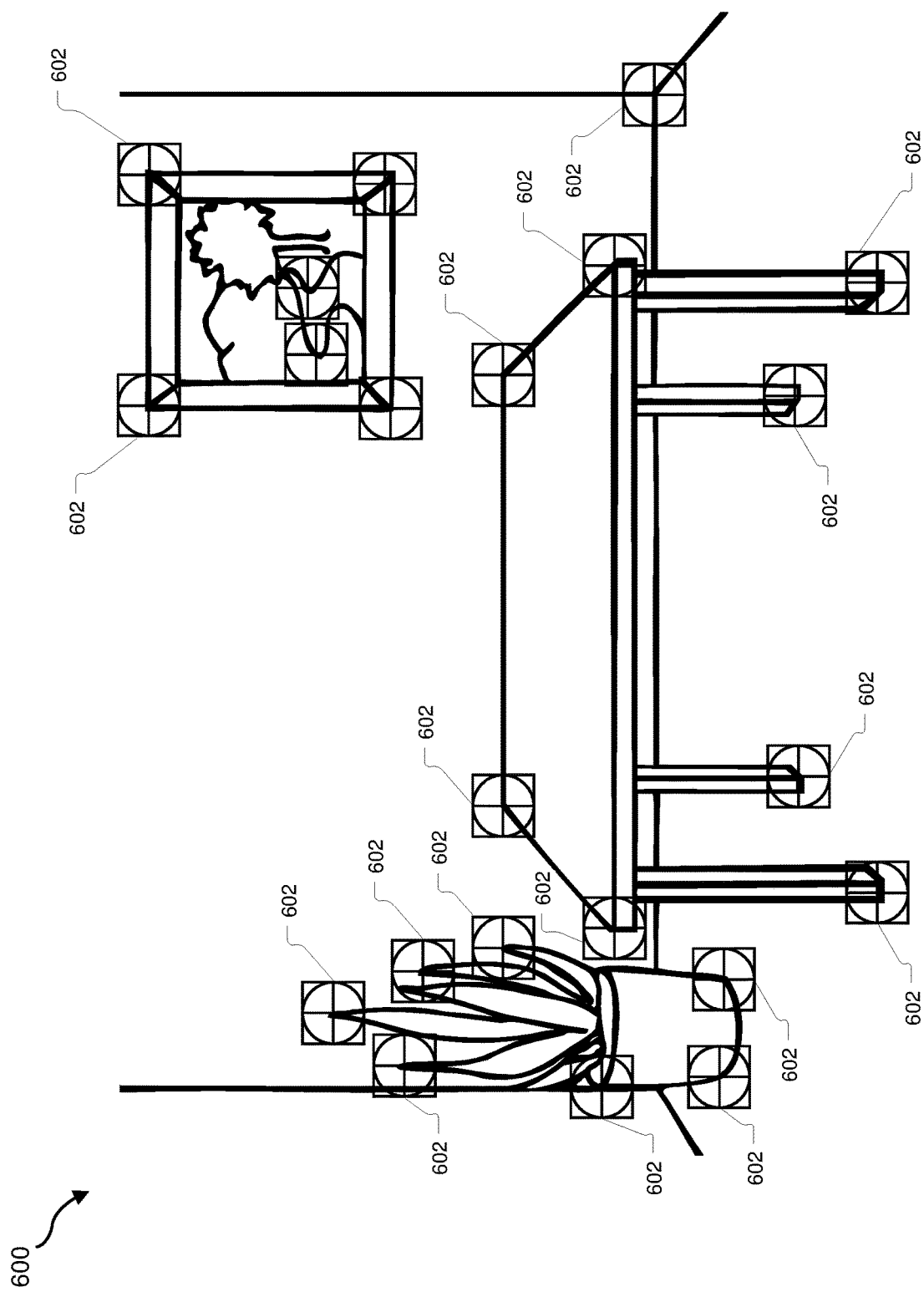
FIG. 6 illustrates image features detected within an image of a real-world environment.

By way of illustration, FIG. 6 shows an image 600, which is similar to image 500 in FIG. 5, but with various detected image features indicated by image feature indicators 602.

In some examples, a "feature descriptor" may include any information that describes one or more properties of an image feature. For example, a feature descriptor may include two-dimensional coordinates of a pixel or region of pixels included in an image that may contain a detected image feature. Additionally or alternatively, a feature descriptor may include a result of a feature description algorithm applied to an image feature and/or an area of the image surrounding the image feature. As an example, a Speed Up Robust Feature (SURF) feature descriptor may be generated based on an evaluation of an intensity distribution of pixels within a "neighborhood" of an identified point of interest.

Many feature detection algorithms may also include and/or may be associated with feature description algorithms. For example, the Scale Invariant Feature Transform (SIFT) algorithm includes both a feature detection algorithm, based on a Difference of Gaussians feature detection algorithm, as well as a "keypoint descriptor" feature description algorithm which, in general, extracts a 16×16 neighborhood surrounding a detected image feature, subdivides the neighborhood into 4×4 sub-blocks, and generates histograms based on the sub-blocks, resulting in a feature descriptor with 128 values. As another example, the Oriented FAST and Rotated BRIEF (ORB) algorithm uses a variation of the FAST corner detection algorithm to detect image features, and generates feature descriptors based on a modified version of a Binary Robust Independent Elementary Features (BRIEF) feature description algorithm. Additional examples of feature detection algorithms and/or feature description algorithms may include, without limitation, Speed Up Robust Feature (SURF), KAZE, Accelerated-KAZE (AKAZE), Binary Robust Invariant Scalable Keypoints (BRISK), Gradient Location and Orientation Histogram (GLOH), histogram of oriented gradients (HOG), Multiscale Oriented Patches descriptor (MOTS), variations or combinations of one or more of the same, and so forth.

Acquiring module 104 may detect at least one image feature included in the image and may generate a feature descriptor based on the image feature included in the image in any suitable way, such as by applying a suitable feature detection algorithm and/or a suitable feature description algorithm to the image. For example, acquiring module 104 may detect at least one image feature included in an image, and may generate one or more feature descriptors based on the detected image feature, by applying an ORB feature detection and feature description algorithm to the image. This may result in at least one feature descriptor that may describe a feature included in the captured image. Acquiring module 104 may then include the feature descriptor as at least part of real-world environment information 212.

In additional embodiments, acquiring module 104 may further acquire real-world environment information 212 by identifying, based on an image feature and an orientation of an imaging device at a time of capturing the image, a feature ray that includes an origin at a point associated with the imaging device and with a direction that causes the feature ray to intersect with the image feature.

Acquiring module 104 may identify a feature ray in any suitable way. For example, acquiring module 104 may remove an effect of one or more intrinsic parameters of imaging device 228 from an image in any of the ways described above. Acquiring module 104 may then establish a "pinhole camera" mathematical model with a lens of the imaging device as an origin and the image as an image plane positioned a distance of a focal length of the camera from the origin and oriented in accordance with a detected orientation of the imaging device when the image was captured. Acquiring module 104 may identify a ray with an origin at a position associated with the imaging device (e.g., a lens of the imaging device) and a direction that causes the ray to intersect and/or pass through a detected image feature included in the image via this mathematical model. Acquiring module 104 may then include the feature ray as part of real-world environment information 212.

Several benefits may be realized by including feature descriptors and/or feature rays as part of real-world environment information 212 instead of a captured image. For example, this may conserve bandwidth resources, as feature descriptors and/or feature rays may require less bandwidth to transmit from a client device (e.g., client device 202) to a relocalization service (e.g., RLS server 206) than raw images. Additionally, directing a client device (e.g., client device 202) to generate feature descriptors and/or identify feature rays may efficiently utilize computing resources of the client device and may conserve computing resources of the relocalization service (e.g., RLS server 206). Furthermore, transmitting feature descriptors and/or feature rays instead of a captured image may effectively remove any sensitive and/or private information from the image, thereby anonymizing the transmitted data and protecting user privacy.

In some embodiments, acquiring module 104 may include information gathered, detected, perceived, and/or associated with sensor 230 as part of real-world environment information 212. For example, as mentioned above, sensor 230 may include any suitable sensor that may gather (e.g., observe, view, receive, locate, identify, store, etc.) information associated with a real-world environment (e.g., real-world environment information 212). Acquiring module 104 may include any combination of this information as part of real-world environment information 212.

Furthermore, in some examples, such as at times when a client device has been previously relocalized via one or more of the systems and methods described herein, acquiring module 104 may further include, as part of real-world environment information 212, a previously determined position of the client device relative to at least one mapped position within the real-world environment. For example, acquiring module 104 may include, as part of real-world environment information 212, an identifier associated with a previous anchor point and a relative translation between a mapped position of the previous anchor point and a previously determined position of client device 202. Furthermore, in some examples, acquiring module 104 may additionally or alternatively include a confidence level associated with the previously determined position of client device 202. For example, suppose that, as a result of a previous relocalization, client device 202 received a previous anchor point identifier, a previous relative translation between the mapped location of the previous anchor point and the previous position of client device 202, and a confidence level of 92%. Acquiring module 104 may include this information as at least part of real-world environment information 212, and a relocalization service may utilize this information in a current and/or subsequent relocalization process.

Returning to FIG. 3, at step 320, one or more of the systems described herein may transmit information representative of a real-world environment to a relocalization service. For example, transmitting module 106 may, as part of client device 202, RLS server 206, or asset management service server 208 in FIG. 2, transmit real-world environment information 212 to relocalization server 206.

Transmitting module 106 may cause client device 202, RLS server 206, or asset management service server 208 to transmit real-world environment information 212 to relocalization server 206 in any suitable way. For example, as described above, at least one of modules 102 (e.g., acquiring module 104) may cause client device 202 to acquire real-world environment information 212 via imaging device 228 and/or sensor 230. Transmitting module 106 may then cause client device 202 to transmit real-world environment information 212 to RLS server 206 via network 204 (e.g., via any suitable communications medium and/or protocol that implements network 204).

In some embodiments, when RLS server 206 receives real-world environment information 212, one or more of the systems described herein may perform one or more operations to relocalize client device 202 within real-world environment 210. For example, in at least one embodiment, positioning module 116 may, as part of client device 202, RLS server 206, and/or asset management service server 208 in FIG. 2, determine a coarse position of client device 202 based on a part of real-world environment information 212 (e.g., a GPS coordinate, a network identifier, etc.), identify a fine position of client device 202 based on the coarse position and an additional part of real-world environment information 212 (e.g., a captured image, an orientation of the imaging device at a time of capturing the captured image, an image feature, a feature descriptor, a feature ray, etc.), and may select an anchor point based on the fine position of the client device.

In some examples, a "coarse position" may include any information that may include, describe, and/or may be associated with a region of a real-world environment. For example, a coarse position of a client device (e.g., a client device 202) may include, without limitation, a region of a real-world environment surrounding a GPS coordinate (e.g., a region of a real-world environment within a predefined distance of a GPS coordinate), a region of a real-world environment within which a client device may access and/or observe a network identifier, a portion of a predefined map that may be associated with and/or may correspond to a region of a real-world environment that the client device is currently near to or within, and so forth.

Figure 7:
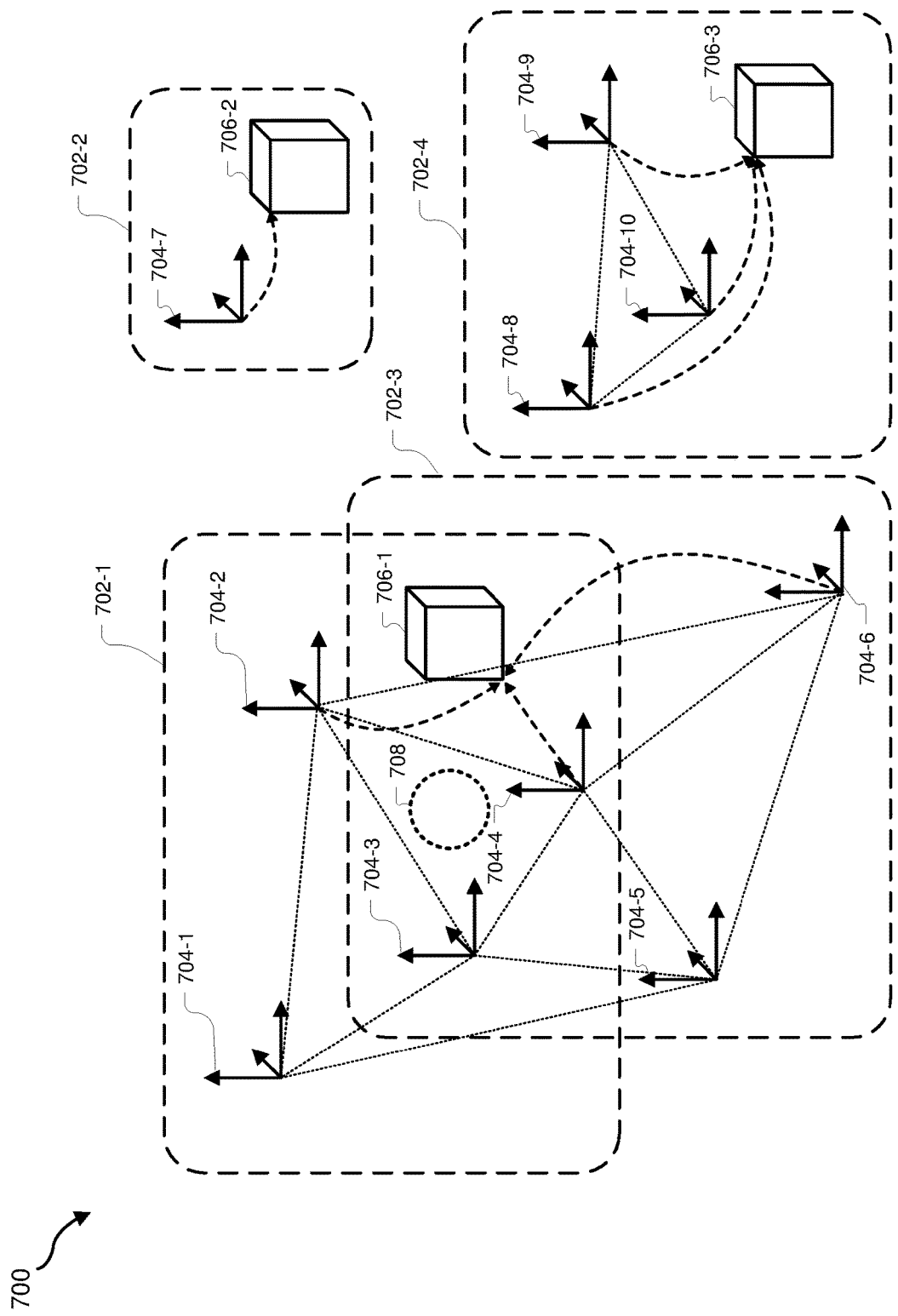
FIG. 7 illustrates a map of a real-world environment that includes various anchor points that indicate mapped positions within the real-world environment.

By way of illustration, FIG. 7 shows a map 700 of a real-world environment. Map 700 may be generated and/or pre-generated in any suitable way, such as via a preliminary computer vision and/or simultaneous localization and mapping (SLAM) process. As shown, map 700 includes various predefined regions, referred to herein as relocalization entities 702 (e.g., relocalization entities 702-1 through 702-4). A "relocalization entity" may include any portion of map 700 that includes sufficient information to enable a client device (e.g., client device 202) to relocalize into a position within an area or region of a real-world environment represented by map 700.

In some examples, as further shown in FIG. 7, relocalization entities may "overlap" each other, in that a relocalization entity may correspond to and/or may be associated with at least a portion of a real-world environment that also corresponds to and/or is associated with an additional relocalization entity. For example, as shown in FIG. 7, relocalization entity 702-3 partially overlaps relocalization entity 702-1, which may indicate that relocalization entity 702-1 and relocalization entity 702-3 are both at least partially associated with and/or correspond to the same portion of the real-world environment (i.e., the region of the real-world environment represented by the portion of map 700 where relocalization entity 702-3 overlaps relocalization entity 702-1 overlap).

As further shown in FIG. 7, map 700 may include one or more anchor points 704 (e.g., anchor points 704-1 through 704-10) that may represent mapped positions and/or poses within a real-world environment. Each anchor point 704 may be included in one or more relocalization entities 702.

Furthermore, as relocalization entities 702 may overlap with each other, each anchor point 704 may be included in one or more relocalization entity 702. For example, anchor point 704-1 may be included in relocalization entity 702-1, whereas anchor point 704-3 may be included in both relocalization entity 702-1 and 702-3.

Additionally, as noted by dotted lines connecting anchor points 704 (e.g., the dotted line connecting anchor point 704-1 and anchor point 704-2, the dotted line connecting anchor point 704-1 and anchor point 704-5, etc.), anchor points 704 may be expressed and/or stored (e.g., within data store 140 as a part of localization data 142) as a connected graph. In some examples, connections between anchor points may represent, may be expressed as, and/or may be stored as relative transformations between anchor points. By traversing the graph, one or more of modules 102 (e.g., positioning module 116) may determine a relative transformation between connected anchor points (e.g., between anchor point 704-1 and anchor point). In some examples, the relative poses of anchor points included within a map (e.g., map 700) and/or a particular portion of the map (e.g., relocalization entity 702) may be consistent, such that if a client device relocalizes in reference to a first anchor point and a second client device relocalizes in reference to a second anchor point, both client devices may be relocalized into the same frame of reference. This consistency may provide benefits such as an ability to pre-determine and/or cache relative transformations between anchor points, as will be described in greater detail below.

FIG. 700 also includes virtual objects 706 (e.g., virtual object 706-1 to 706-3). As shown by dashed arrows between each of virtual objects 706 and at least one of anchor points 704 (e.g., the arrow from anchor point 704-2 to virtual object 706-1), one or more virtual objects may be attached to (e.g., may be positioned within a virtual environment relative to a mapped position of) one or more anchor points. For example, virtual object 706-1 may be attached to anchor points 704-2, 704-4, and 704-6. Thus, virtual object 706-1 may be identified and/or positioned within an artificial environment by reference to one or more of anchor points 704-2, 704-4, and/or 704-6. In some examples, these "attachments" may be expressed in terms of relative transformations between mapped positions of anchor points and positions of virtual objects attached to the anchor points. As a simplified example, a position of virtual object 704-7 may be expressed as "two meters to the right of anchor point 706-2" (within a frame of reference of map 700).

Positioning module 116 may determine a coarse position of client device 202 in any suitable way. For example, as described above, real-world environment information 212 may include any suitable coarse position information associated with a position of client device 202, such as a GPS coordinate, a network identifier (e.g., a network name, a service set identifier (SSID), a cellular and/or mobile network identifier, etc.), and so forth. Positioning module 116 may use this information to identify one or more portions of map 700 (e.g., one or more relocalization entities 702 within map 700) that may correspond to and/or may be associated with a real-world position of client device 202. Thus, in at least some embodiments, one or more of modules 102 (e.g., positioning module 116) may determine a coarse position of client device 202 by identifying one or more relocalization entities that are associated with and/or correspond to a real-world position of client device 202.

For example, real-world environment information 212 may include an SSID with an identifier "BuildingA3rdFloorWiFi" that may correspond to and/or may be associated with a mapped position and/or region included in map 700. Positioning module 116 may access real-world environment information 212, identify the included SSID, and may identify and/or access one or more portions of map 700 (e.g., one or more relocalization entities 702 within map 700) that may be associated with and/or may correspond to a region of real-world environment 210 within which a client device (e.g., client device 202) may observe the included SSID.

As an additional example, suppose real-world environment information 212 also includes a GPS coordinate. Positioning module 116 may access real-world environment information 212, identify the included GPS coordinate, and may identify and/or access one or more portions of map 700 (e.g., one or more relocalization entities 702) that may be associated with and/or may correspond to a region of real-world environment 210 within which (1) a client device may observe the included SSID, and (2) a client device may determine (e.g., receive and/or triangulate) the included GPS coordinate.

Continuing with the above example, based on the SSID and GPS coordinate included in real-world environment information 212, positioning module 116 may determine that client device 202 is within a region of real-world environment 210 represented by indicator 708 in FIG. 7. Hence, positioning module 116 may identify a coarse position of client device 202 by determining that the client device is within a region of real-world environment 210 corresponding to relocalization entity 702-1 and relocalization entity 702-3.

Additionally, in some examples, positioning module 116 may identify a fine position of the client device based on the coarse position and an additional part of the information representative of the real-world environment. For example, positioning module 116 may identify a fine position of client device 202 based on the coarse position and at least part of real-world environment information 212. In some examples, a "fine position" of a client device may include and/or may correspond to a relocalized position and/or pose of the client device within a real-world environment.

Positioning module 116 may identify a fine position of client device 202 in a variety of contexts. For example, as mentioned above, real-world environment information 212 may include a variety of image information (e.g., a captured image, one or more image features, one or more feature descriptors, one or more feature rays, etc.). Positioning module 116 may use this image information to identify the fine position of client device 202 via one or more computer vision and/or SLAM techniques.

For example, as mentioned above, map 700 may be pre-generated in accordance with a computer vision and/or SLAM mapping process. As such, in addition to the elements shown in FIG. 7, map 700 may include information associated with one or more image features (e.g., one or more feature descriptors, one or more feature rays, etc.). Hence, positioning module 116 may identify an anchor point by correlating and/or matching one or more image features that may be associated with the anchor point with one or more image features, feature descriptors, and/or feature rays that may be included in real-world environment information 212.

Additionally or alternatively, in embodiments where real-world environment information 212 includes an image (e.g., an image captured via imaging device 228), positioning module 116 may identify image features included in the image and/or generate feature descriptors associated with the identified features in any suitable way, including any of the ways described herein. positioning module 116 may then use this information to identify a fine position of a client device in any of the ways described herein.

Returning to the example illustrated by FIG. 7, positioning module 116 may determine that a client device (e.g., client device 202) is positioned within a region of real-world environment 210 represented by indicator 708 in FIG. 7, and may therefore attempt to identify an anchor point by correlating and/or matching one or more image features, feature descriptors, and/or feature rays included in and/or derived from real-world environment information 212 with one or more image feature descriptors, and/or feature rays associated with one or more anchor points included in relocalization entity 702-1 and/or relocalization entity 702-3.

In some examples, as positioning module 116 may have already determined that a coarse position of client device 202 includes one or more relocalization entities (e.g., relocalization entity 702-1 and/or relocalization entity 702-3), positioning module 116 may exclude anchor points positioned within other relocalization entities (e.g., anchor points included in relocalization entities 702-2 and 702-4) from a search space. Excluding anchor points outside of the coarse position (e.g., outside of relocalization entity 702-1 and relocalization entity 702-3) may limit a scope and/or amount of data that positioning module 116 may need to store, access, process, and/or search through when identifying one or more anchor points included in map 700, which may improve speed and/or efficiency of relocalization.

In some examples, positioning module 116 may identify only one anchor point within one or more relocalization entities. In additional examples, positioning module 116 may identify more than one anchor point within one or more relocalization entities. In any case, positioning module 116 may select at least one of the identified anchor points and may determine a position within a real-world environment of a client device relative to the mapped position of the selected anchor point. For example, positioning module 116 may determine, via any suitable positioning technique or combination of positioning techniques, such as those described herein (e.g., a computer vision positioning technique, a SLAM positioning technique, an inertial navigation positioning technique, etc.), that real-world environment information 212 indicates a location, orientation, position and/or pose of client device 202 within real-word environment 210. Positioning module 116 may then compare a location, orientation, position and/or pose of the selected anchor point with the determined location, orientation, position and/or pose of client device 202, and determine a relative transformation based on the position of the selected anchor and the current pose of client device 202 that may relocalize client device 202 within real-world environment 210 relative to the mapped position of the selected anchor point.

Positioning module 116 may then transmit (e.g., from RLS server 206 via network 204) information associated with the selected anchor point (e.g., anchor point information 214) and the determined relative transformation (e.g., client device position 220) to client device 202.

Figure 8:
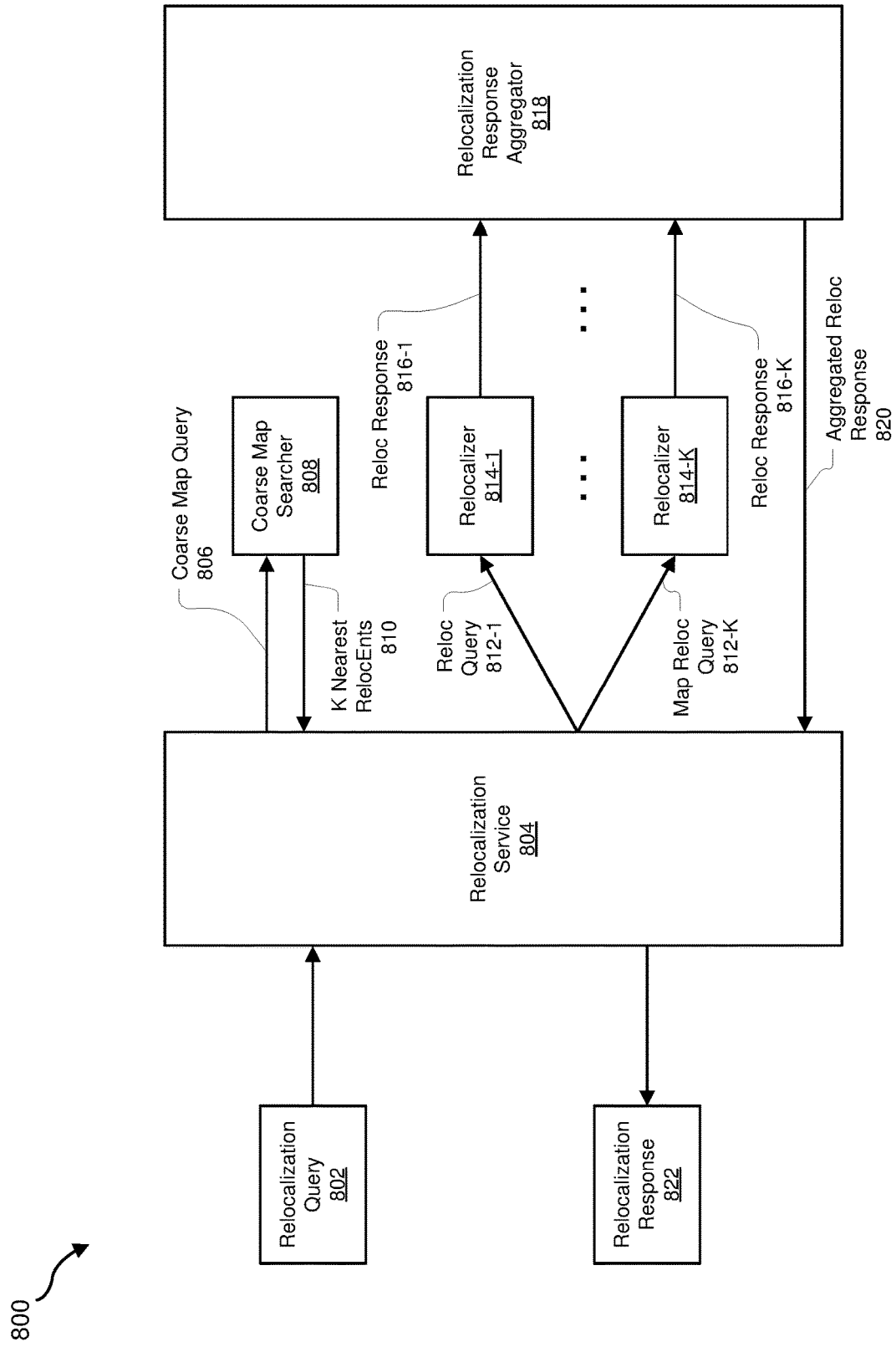
FIG. 8 is a flow diagram for determining a coarse position of a client device, identifying a fine position of the client device based on the coarse position, and selecting an anchor point based on the fine position of the client device.

FIG. 8 is a flow diagram for one possible method by which a relocalization service may determine a coarse position of a client device, may identify a fine position of the client device based on the coarse position, and may select the anchor point based on the fine position of the client device. As shown, at relocalization query 802, information associated with a real-world environment (e.g., real-world environment information 212) is provided to relocalization service 804 (e.g., transmitted to the relocalization service by a client device, such as client device 202). At coarse map query 806, position metadata (e.g., a GPS coordinate, a network identifier, etc.) is extracted from relocalization query 802 and is sent to coarse map searcher 808. Coarse map searcher 808 identifies a number of relocalization entities and provides them, as K nearest relocalization entities 810 ("K nearest RelocEnts 810" in FIG. 8), to relocalization service 804.

For each identified relocalization entity, relocalization service 804 submits a relocalization query 812 ("reloc query" 812-1 to 812-K in FIG. 8) to a corresponding relocalizer process 814 (e.g., relocalizer 814-1 to 814-K in FIG. 8) that performs fine-grained matching (e.g., image feature matching) and relocalization with respect to the identified relocalization entity. In some examples, relocalizers 814 may operate in parallel. In additional examples, relocalizers 814 may operate with prioritization, with early exit after relocalization into any relocalization entity.

Relocalizers 814 may send relocalizer responses 816 (e.g., "reloc response" 816-1 to 816-K in FIG. 8) to relocalization response aggregator 818, which may aggregate relocalizer responses 816, and may send an aggregated relocalization response 820 to relocalization service 804. Relocalization service 804 may then repackage aggregated relocalization response 820 as relocalization response 822 and may send relocalization response 822 to the client device (e.g., client device 202).

Returning to FIG. 3, at step 330, one or more of the systems described herein may receive, from a relocalization service in response to information representative of a real-world environment, (1) information associated with an anchor point that may include a mapped location within the real-world environment, and (2) a determined location within the real-world environment of the client device relative to the mapped location of the anchor point. For example, receiving module 108 may, as part of client device 202, RLS server 206, and/or asset management service server 208 in FIG. 2, receive, from RLS server 206 in response to real-world environment information 212, (1) anchor point information 214 that may include anchor point position 216, and (2) client device position 220.

Receiving module 108 may receive anchor point information 214 and client device position 220 in a variety of contexts. For example, as described above, one or more of modules 102 (e.g., positioning module 116) may, as part of RLS server 206, select an anchor point and may determine a location within real-world environment 210 of client device 202 relative to the anchor point (e.g., client device position 220). The relocalization service (e.g., RLS server 206) may then transmit information associated with the selected anchor point, as anchor point information 214, and the determined location within real-world environment 210 of client device 202 relative to the selected anchor point, as client device position 220, to client device 202 via network 204. Receiving module 108 may then, as part of client device 202, receive anchor point information 214 and client device position 220 via network 204 as one or more packets of data transmitted across network 204 in accordance with a suitable communication protocol and/or medium that facilitates network 204. Receiving module 108 may then, as part of client device 202, receive anchor point information 214 and client device position 220 via network 204.

Returning to FIG. 3, at step 340, one or more of the systems described herein may send a query that may include an identifier associated with the anchor point to an asset management service. For example, sending module 110 may, as part of client device 202, RLS server 206, or AMS server 208 in FIG. 2, send query 222 that may include anchor point identifier 218 to AMS server 208.

Query 222 may include any information that includes a request to an asset management service (e.g., AMS server 208) for information associated with (e.g., one or more digital assets "attached to" an anchor point associated with) an anchor point identifier 218. Likewise, anchor point identifier 218 may include any information that may be associated with and/or may be used to identify a mapped position within a real-world environment (e.g., anchor point position 216). For example, anchor point identifier 218 may include, without limitation, a database reference to anchor point position 216, a pointer to a record in a database (e.g., data store 140) that includes anchor point position 216, a description of anchor point position 216, a storage location of data representative of anchor point position 216, and so forth. In some examples, as described above, anchor point identifier 218 may be included as part of anchor point information 214.

Sending module 110 may cause client device 202, RLS server 206, or AMS server 208 to send query 222 that may include anchor point identifier 218 to AMS server 208 in any suitable way. For example, sending module 110 may cause client device 202 to generate query 222 by identifying anchor point identifier 218 within anchor point information 214, generating query 222 by including anchor point identifier 218 within a request for data stored, maintained, and/or included in AMS server 208, and transmitting query 222 to AMS server 208 via network 204 (e.g., via any suitable communications medium and/or protocol that implements network 204).

Returning to FIG. 3, at step 350, one or more of the systems described herein may obtain, from the asset management service in response to the query, information representative of at least one digital asset. For example, obtaining module 112 may, as part of client device 202, RLS server 206, or asset management service server 208 in FIG. 2, obtain, from asset management service server 208 in response to query 222, digital asset 224.

Obtaining module 112 may cause client device 202, RLS server 206, or AMS server 208 to obtain, from AMS server 208 in response to query 222, digital asset 224 in any suitable way. For example, obtaining module 112 may, upon receiving query 222 from client device 202, cause AMS server 208 to access asset data 144 from data store 140 and may, using anchor point identifier 218, cause AMS server 208 to identify a digital asset 224 associated with anchor point identifier 218. Upon identifying digital asset 224, obtaining module 112 may cause AMS server 208 to send digital asset 224 to client device 202 via network 204 (e.g., via any suitable communications medium and/or protocol that implements network 204) for presentation within an artificial environment (e.g., via client device 202). Hence, obtaining module 112 may, as part of client device 202, obtain digital asset 224 from AMS server 208 via network 204.

Returning to FIG. 3, at step 360, one or more of the systems described herein may present a digital asset at a position within an artificial environment relative to a determined position of a client device within a real-world environment and a mapped position of an anchor point. For example, presenting module 114 may, as part of client device 202, RLS server 206, or AMS server 208 in FIG. 2, present digital asset 224 at presentation position 226, wherein presentation position 226 may represent a position within an artificial environment relative to client device position 220 and anchor point position 216.

In some examples, an "artificial environment" may include any computer-generated environment including, without limitation, a two-dimensional environment, a three-dimensional environment, a VR environment, an AR environment, a combination of one or more of the same, and so forth. In some examples, an artificial environment may include a two- or three-dimensional representation of a real-world environment (e.g., real-world environment 210). In some examples, an artificial environment may be overlaid and/or composited with an image of the real-world environment. In some such examples, one or more digital assets included in the artificial environment may appear to a user, when the user views the composite image, to exist within the real-world environment.

Presenting module 114 may present digital asset 224 at presentation position 226 in a variety of contexts. For example, upon receiving client device position 220, presenting module 114 may relocalize client device 202 within real-world environment 210 by adjusting a local coordinate system and/or a local map of real-world environment 210 maintained by client device 202 such that the local coordinate system and/or local map of real-world environment 210 may be aligned and/or realigned with real-world environment 210.

For example, as described above in reference to FIG. 7, positioning module 116 may determine a relative transformation from anchor point position 216 to client device position 220 (i.e., a position of client device 202 relative to anchor point position 216), and may include the relative transformation as part of client device position 220. Based on this relative transformation, presentation module 114 may update a position of client device 202 within a local map of real-world environment 210 maintained by client device 202.

In some examples, client device 202 may present an artificial environment such that the position of client device 202 within the artificial reality environment may correspond to client device position 220 within real-world environment 210. Hence, client device 202 may be relocalized within real-world environment 210, and client device 202 and may be enabled to present one or more digital assets within the artificial environment such that positions within the artificial environment align with positions within real-world environment 210.

Furthermore, in some examples, presenting module 114 may present a digital asset (e.g., digital asset 224) at presentation position 226 by determining a position within an artificial environment that corresponds to a position within a real-world environment relative to anchor point position 216 and client device position 220.

Figure 9:
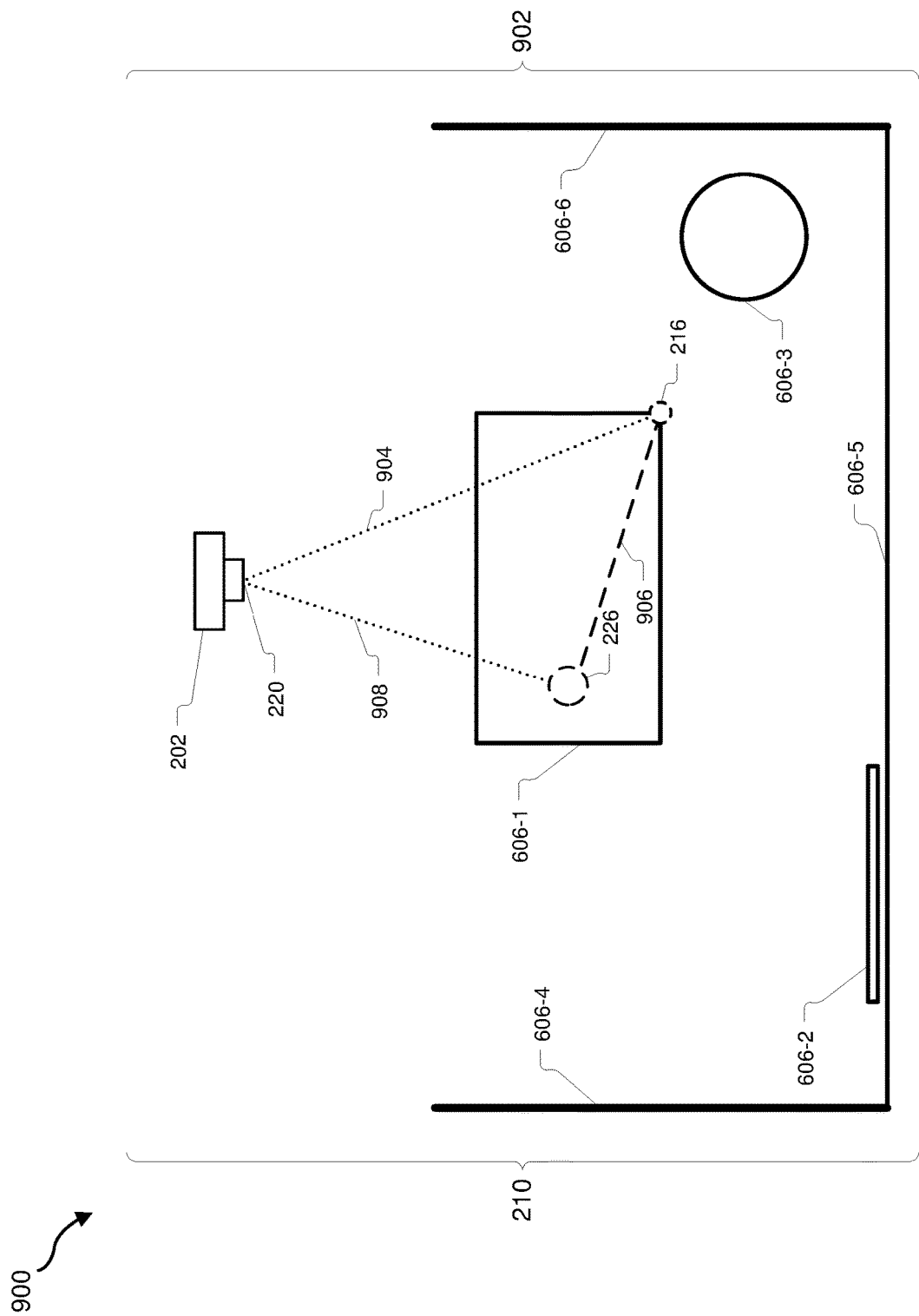
FIG. 9 illustrates an overhead view of an artificial environment (e.g., an artificial reality environment overlaid on a real-world environment) that includes a position within the artificial environment relative to a client device and a mapped position of an anchor point.

By way of illustration, FIG. 9 shows an overhead view 900 of an artificial environment 902, which may be an augmented reality environment overlaid on real-world environment 210. As shown, presenting module 114, as part of client device 202, RLS server 206, and/or AMS server 208, may relocalize client device 202 within real-world environment 210 relative to anchor point position 216, as indicated by dotted line 904. Furthermore, obtaining module 112 may obtain information representative of digital asset 224, which may include a position of digital asset 224 relative to anchor point position 216 (e.g., presentation position 226).

As further shown in FIG. 9, presenting module 114 may also determine presentation position 226 for digital asset 224 relative to anchor point position 216, as indicated by dashed line 906. In some examples, dashed line 906 may represent a relative transformation from a mapped location of an anchor point (e.g., anchor point position 216) to a presentation position of digital asset 224 (e.g., presentation position 226). As a simplified illustration, a relative transformation from anchor point position 216 to presentation position 226 may be represented by the statement "digital asset 224 is positioned 1.2 meters east and 0.4 meters north of anchor point position 216." As described above, this relative transformation may be stored (e.g., within asset data 144), accessed (e.g., by obtaining module 112), and/or transmitted to client device 202 (e.g., by obtaining module 112) in association with and/or as part of digital asset 224. Hence, presentation module 114 may determine presentation position 226 by (1) identifying a position within artificial environment 902 that may correspond to the position of digital asset 224 relative to the anchor point position 216 within real-world environment 210, and (2) designating the identified position as presentation position 226.

Furthermore, as also shown in FIG. 9, in some examples, presenting module 114 may also determine presentation position 226 relative to client device position 220, as indicated by dotted line 908. For example, presenting module 114 may determine presentation position 226 based on a relative transformation from anchor point position 216 to client device position 220 and a relative transformation from anchor point position 216 to a predetermined position of digital asset 224. This may enable finer positioning of digital asset 224 within artificial environment 902 and/or more stable viewing of digital asset 224 via client device 202 (e.g., via a display included in client device 202).

Figure 10:
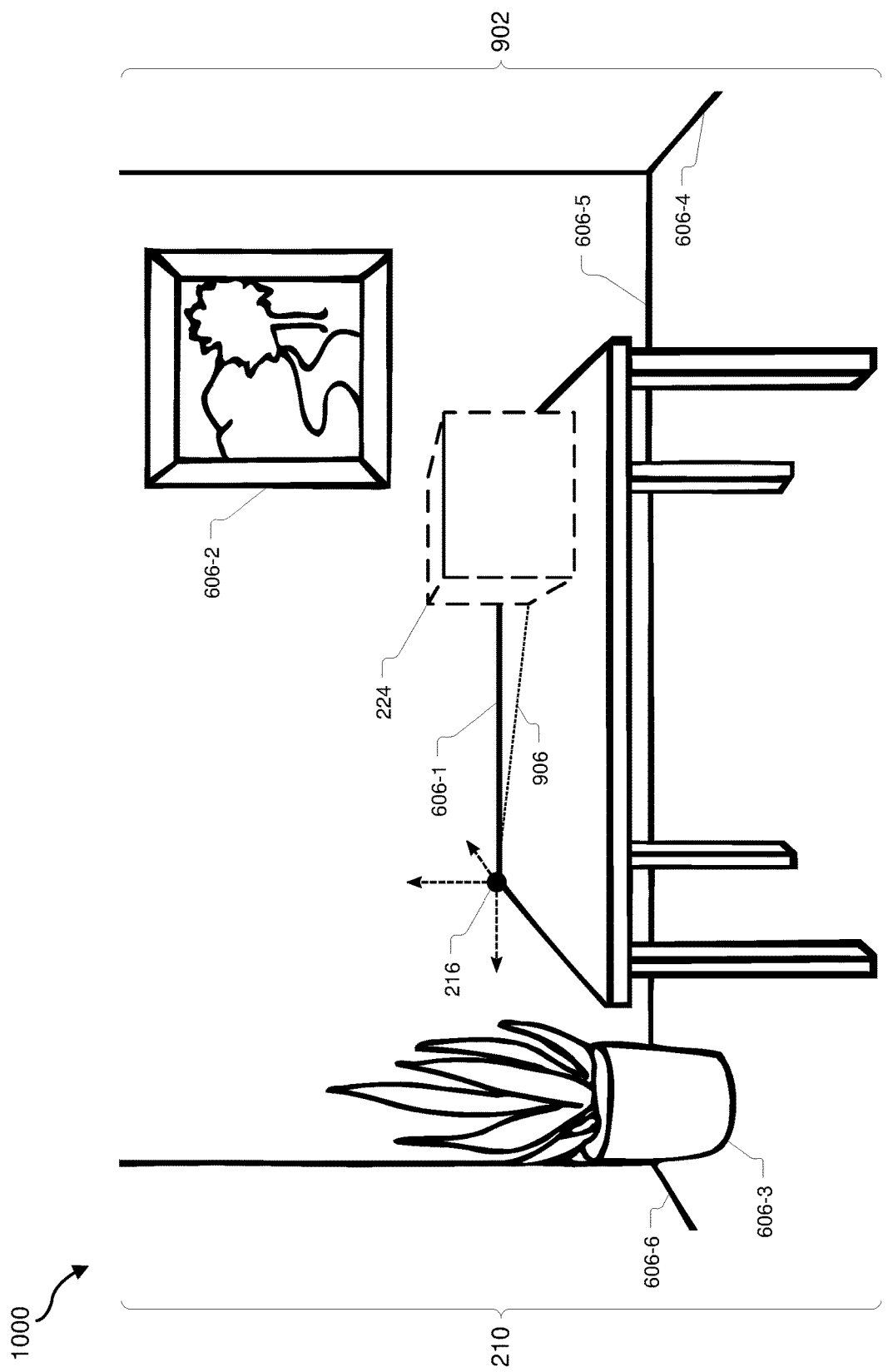
FIG. 10 illustrates a first-person view of an artificial environment (e.g., an artificial reality environment overlaid on a real-world environment) that includes a digital asset (e.g., a virtual object) presented at a position within the artificial environment relative to a determined position of a client device and a mapped position of an anchor point.

FIG. 10 shows a first-person view 1000 of artificial environment 902 overlaid on real-world environment 210 that includes digital asset 224 presented at presentation position 226 within artificial environment 902. Note that dotted line 904 and dotted line 908 are omitted for clarity, and presentation position 226 is omitted as it may be obscured by digital asset 224.

In some examples, a client device (e.g., client device 202) may continue to move through a real-world environment during a relocalization process and/or asset management process as described herein. Thus, a determined position of the client device within the real-world environment (e.g., client device position 220) may no longer correspond to a true position of the client device within the real-world environment when presenting module 114 attempts to present a virtual object (e.g., digital asset 224) within an artificial environment.

Hence, in some embodiments, one or more of the systems described herein may track a motion of a client device within a real-world environment (e.g., during a relocalization process and/or an asset management process), and may update the determined position of the client device within the real-world environment (e.g., client device position 220) based on the motion of the client device within the real-world environment. For example, tracking module 118 may, as part of client device 202, RLS server 206, and/or AMS server 208, track a motion of client device 202 within real-world environment 210, and may update client device position 220 based on the motion of the client device within real-world environment 210.

Tracking module 118 may track a motion of client device 202 within real-world environment 210 in a variety of contexts. For example, tracking module 118 may track the motion of client device 202 within real-world environment 210 by determining, at a time that transmitting module 106 transmits real-world environment information 212 to RLS server 206, an initial position of client device 202 within real-world environment 210.

For example, when transmitting module 106 transmits real-world environment information 212 to RLS server 206, tracking module 118 may receive and/or access information gathered by imaging device 228 and/or sensor 230, and may use the information gathered by imaging device 228 and/or sensor 230 (e.g., an image, a GPS coordinate, an orientation, a specific force, an inertial measurement, an angular rate, a linear velocity, a magnetic field, etc.) to determine and/or establish an initial position of client device 202. In some examples, tracking module 118 may generate an additional anchor point that corresponds to the initial position. In at least one example, tracking module 118 may record the additional anchor point as part of a local map of real-world environment 210, such as a local map of real-world environment 210 maintained by client device 202.

Tracking module 118 may further track a motion of client device 202 within the real-world environment relative to the additional anchor point. For example, by analyzing information gathered by imaging device 228 and/or sensor 230 over a period of time, tracking module 118 may determine a course and/or a path of client device 202 through real-world environment 210 relative to the initial position as indicated by the additional anchor point. Thus, at any time after receiving module 108 receives anchor point information 214 and client device position 220, tracking module 118 may update client device position 220 based on the position of the additional anchor and/or the tracked motion of client device 202 through real-world environment 210 relative to the position of the additional anchor point.

Figure 11:
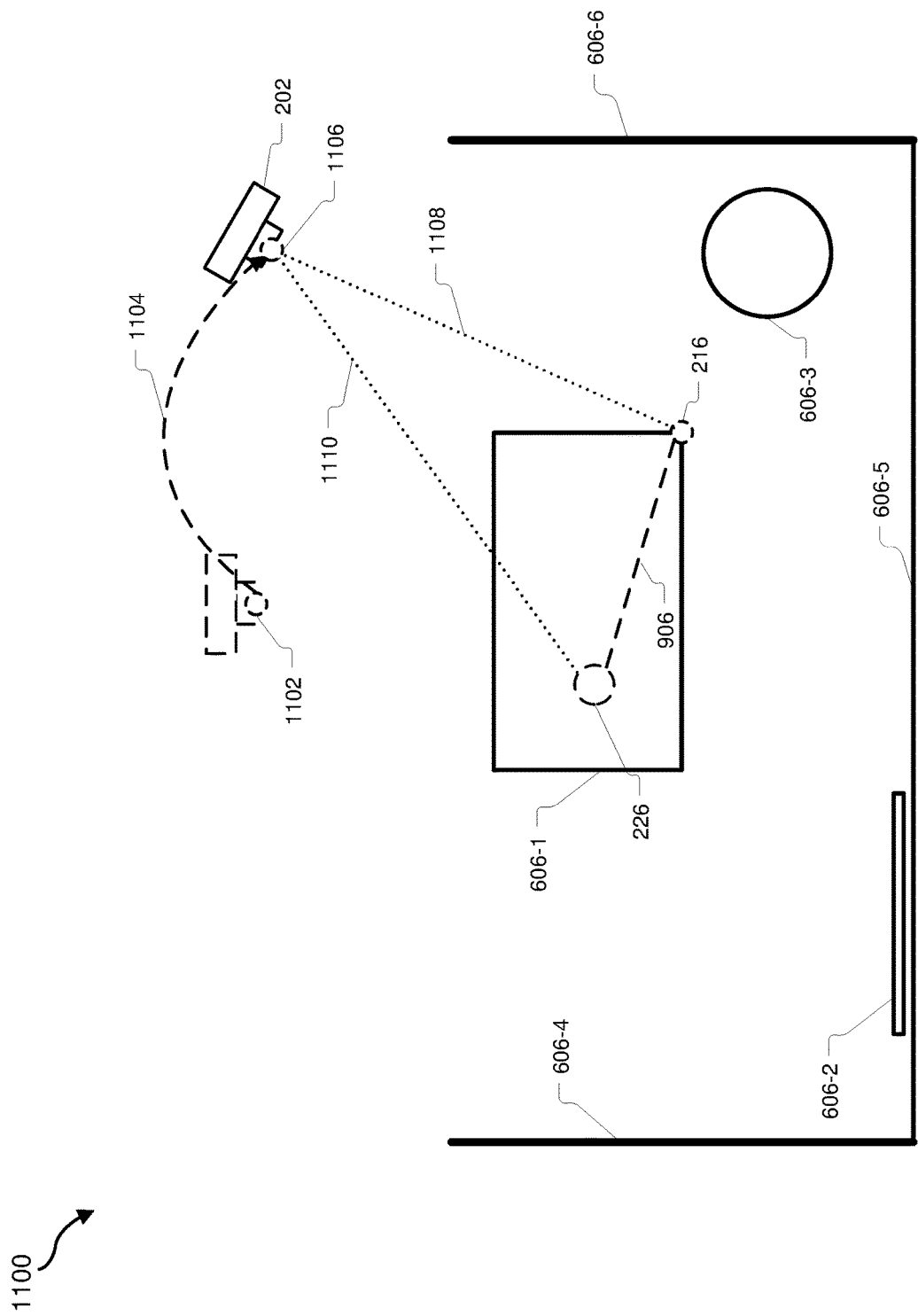
FIG. 11 illustrates tracking a motion of a client device within a real-world environment and updating the determined position within the real-world environment of the client device based on the motion of the client device within the real-world environment.

To illustrate, FIG. 11 shows an additional overhead view 1100 of real-world environment 210 and artificial environment 902. Overhead view 1100 is similar to overhead view 900 in FIG. 11. However, in the scenario shown in FIG. 11, client device 202 may have moved after transmitting module 106 transmitted real-world environment information 212 to RLS server 206.

As shown in FIG. 11, at the time that transmitting module 106 transmits real-world environment information 212 to RLS server 206, tracking module 118 may determine an initial position 1102 of client device 202 within real-world environment 210 and/or may generate an additional anchor point (e.g., within a local map of real-world environment 210 maintained by client device 202) at a position corresponding to initial position 1102. Tracking module 118 may then track a motion 1104 of client device 202 within real-world environment 210. When presenting module 114 determines presentation position 226, tracking module 118 may update client device position 220 based on initial position 1102 and/or tracked motion 1104. In some examples, tracking module 118 may update client device position 220 by updating a relative transformation from anchor point position 216 to client device position 220 based on tracked motion 1104. For example, as simplified in two dimensions, if client device position 220 indicates that client device 202 is 3 meters north and one meter west of anchor point position 216, and client device 202 moves two meters east, tracking module 118 may update client device position 220 to indicate that client device 202 is 3 meters north and one meter east of anchor point position 216.

Thus, as further shown in FIG. 11, presenting module 114 may relocalize client device 202 within real-world environment 210 relative to anchor point position 216 and updated client device position 1106, as indicated by dotted line 1108. Furthermore, as also shown in FIG. 11, in some examples, presenting module 114 may also determine presentation position 226 relative to updated client device position 1106, as indicated by dotted line 1110.

As mentioned above, one or more of the embodiments disclosed herein may be encoded as a computer program on a computer-readable medium. FIGS. 12-15 include listings of source code that, when executed by a processor of a computing device, may cause the computing device to perform one or more of the operations described herein. As may be apparent to one skilled in the art, the listings included in FIGS. 12-15 may generally be in accordance with conventions and/or syntax of a C++ programming language. This is merely an example, as the embodiments described herein may additionally or alternatively be implemented via any suitable programming language.

FIGS. 12-14 may include various definitions, data structures, data objects, classes, and so forth that may be included in an application programming interface (API) for a relocalization service as described herein.

FIG. 12 includes listing 1200, which includes class 1202 and class 1204. Class 1204 may generally describe a data object that one or more of the systems described herein (e.g., transmitting module 106) may transmit to a relocalization service (e.g., RLS server 206) and that may include information representative of a real-world environment. Class 1202 is named SingleImageRelocPacket, uses a namespace AssetManager, and is derived from a public class named Packet. Class 1202 also includes several public data members and public function members.

Data member persistentClientId has a data type of uint64_t, indicating that persistentClientId may include an unsigned 64-bit integer. Hence, persistentClientId may include an identifier associated with a client (e.g., client device 202) that may be persistent (e.g., across AR sessions, across relocalizations, etc.).

Data members w, h, f, cx, cy, k1, and k2 may be floating point values and may include values corresponding to intrinsic parameters of an imaging device (e.g., imaging device 228).

Data members width, height, and pitch may respectively include integer values corresponding to a width, height, and a pitch of an image.

Data member img_data may include a vector with a data type of unit8_t, indicating that img_data may include a vector of unsigned 8-bit integer values. In some examples, each value in the img_data vector may correspond to a pixel value included in an image.

Data member localAnchorId may be an integer value that may correspond to an identifier of a local anchor point (e.g., an anchor point placed within a local map prior to relocalization).

Class 1202 also includes a public member function serialize that, when called, may serialize the foregoing data members (e.g., persistentClientId, w, h, f, cx, cy, k1, k2, width, height, pitch, img_data, and localAnchorId). In some examples, to "serialize" may refer to a process of translating data structures and/or objects into a format in which they may be stored (e.g., within a storage medium, such as a hard disk, a memory device, a data store such as data store 140, etc.), transmitted (e.g., via a network such as network 204), and/or reconstructed (e.g., by one or more of modules 102).

Class 1204, named RelocResponsePacket, also uses a namespace AssetManager and is derived from the Packet class. Class 1202 includes data members persistentClientId, rotation_q_ca, translation_q_ca, cloudAnchorGuid, and localAnchorId. Class 1202 also includes a public member function serialize.

As in class 1202, public data member persistentClientId has a data type of uint64_t. This data member may include an identifier associated with a client that may be persistent (e.g., across AR sessions, across relocalizations, etc.).

Public data member rotation_q_ca may be a vector of floating point values, and may represent a relative rotation, expressed as a quaternion, from a queried pose (e.g., from a pose of a client device at the time real-world environment information 212 was transmitted to RLS server 206) and a pose of an anchor point identified by the relocalization service identified within this response packet by cloudAnchorGuid, described below.

Public data member translation_q_ca may be a vector of floating point values, and may represent a relative translation and/or transformation from a queried position (e.g., from a position of client device 202 at the time real-world environment information 212 was captured by client device 202 and/or transmitted from client device 202 to RLS server 206) and a position of an anchor point identified by the relocalization service identified within this response packet by cloudAnchorGuid, described below.

Public data member cloudAnchorGuid may be an integer value that may be a globally unique identifier (GUID) associated with an anchor point included in a map (e.g., map 700) of a real-world environment.

As in class 1202, public data member localAnchorId in class 1204 may be an integer value that may correspond to an identifier of a local anchor point (e.g., an anchor point placed within a local map prior to relocalization). Thus, the relocalization service (e.g., RLS server 206) may echo this value back to the client device.

Like in class 1202, class 1204 also includes a public function member serialize that, when called, may serialize the foregoing data members (e.g., persistentClientId, rotation_q_ca, translation_q_ca, cloudAnchorGuid, localAnchorId).

FIG. 13 includes listing 1300, which shows additional data structures and classes that may be used to transmit information representative of a real-world environment (e.g., real-world environment information 212) to a relocalization service (e.g., RLS server 206).

Data structure 1302 is named ImageQuery and includes two data members: Boolean value gravity_aligned and union data structure FeaturesAndDescriptors. Note that, for the purposes of this disclosure, the keyword "union" may indicate a data structure where only one of the possible data members may be defined at one time and may not indicate and/or reflect memory usage of and/or for the data structure.

As shown, Boolean value gravity_aligned may indicate whether the information representative of the real-world environment (e.g., images, image features, feature descriptors, feature rays, etc.) is gravity-aligned, in that the information representative of the real-world environment may have been pre-rotated within the client device's coordinate system to align with a direction of gravity.

Union structure FeaturesAndDescriptors includes four possible data members, each representing a different data structure that may include a different representation of image features and feature descriptors. These data structures may be described in greater detail below.

The data member calibrated_image_features_and_descriptors, with a data type of CalibratedImageFeaturesAndDescriptors, may be used when an imaging device has been calibrated (i.e., when intrinsic parameters of the imaging device have been identified, calculated, determined, etc.), and when effects of intrinsic parameters of the imaging device may have been reduced and/or removed from an image (e.g., by the client device) prior to transmission. Data member calibrated_image_features_and_descriptors may include feature descriptors and feature rays generated and/or identified in any of the ways described herein.

The data member uncalibrated_image_features_and_descriptors, with a data type of UncalibratedImageFeaturesAndDescriptors, may include one or more 2D "normalized" feature locations within an image where an effect of all known intrinsic parameters of an imaging device (e.g., a principal point of imaging device 228) have been removed. In some examples, a relocalization service may assume that only a focal length of the imaging device may be unknown. Feature descriptors associated with the 2D features may also be included.

The data member multi_image_reloc_query, with a data type of MultiImageFeaturesAndDescriptors, may include (1) feature rays from multiple images taken from multiple viewpoints (e.g., via a multi-camera mapping rig), (2) feature origins that may correspond to positions, in the query's local coordinate system, of the camera(s) that observed the feature(s), and (3) feature descriptors associated with the feature rays. The data member multi_image_unknown_scale_reloc_query, also of data type MultiImageFeaturesAndDescriptors, may include similar data as multi_image_reloc_query, but may omit scale information.

Data structure 1304 is named LatLonAlt and includes six data members, all of type double (i.e., a double-precision floating point value). Data member latitude_deg may indicate a degree of latitude, data member longitude_deg may indicate a degree of longitude, and data member altitude_meters may indicate an altitude in meters. Data members lat_radius_meters, lon_radius_meters, and alt_radius_meters may indicate a respective uncertainty radius (in meters) of the values of data members latitude_deg, longitude_deg, and altitude_meters.

Data structure 1306 is named CoarseGeoLocation and includes data member lla with a data type of LatLongAlt (e.g., data structure 1304). Data structure 1308 is named RelocalizationQuery and includes data members (1) location, with a data type of CoarseGeoLocation (e.g., data structure 1306), and (2) image_query with a data type of ImageQuery (e.g., data structure 1302).

Data structure 1310 is named RelocalizationPrior and includes two data members: (1) prior_reloc_ent_id, with a data type of unsigned 64-bit integer, and (2) T_query_reloc_ent, with a data type of SE3d. In some examples, an SE3d data type may include information associated with a 3D and/or 6DoF transformation. Hence, prior_reloc_ent_id may represent an anchor point that was used for a previous relocalization, and T_query_reloc_ent may represent a relative transformation between a current position and the previous anchor point. Providing a previous anchor point may enable a relocalization service (e.g., RLS server 206) to bypass a coarse positioning operation in the relocalization process.

Data structure 1312 is named RelocalizationResponse and includes seven data members. Boolean value success, initialized to a value of false, may indicate a success or failure of a relocalization. Unsigned 64-bit integer localized_ent_id may represent an identifier for an anchor point within a predefined map of a real-world environment. Data member T_ent_query of data type SE3d may indicate a relative transformation from a position of the anchor point (e.g., localized_ent_id) and a determined position of the client device.

Data member scale_ent_query of data type double, initialized to a value of 1.0, may indicate a scale that may upgrade a querying client to a metric scale. Data member estimated_focal_length has a data type of double. This may correspond to an estimated focal length of an imaging device (e.g., imaging device 228) that may have been used to capture image data submitted to the relocalization service as part of the relocalization query (e.g., as part of real-world environment information 212).

Additional data members within data structure 1312 may be optional. Integer value num_inliers, initialized to a value of 0, and integer vector inlier_indices may indicate a number and/or indices of image features (e.g., image features identified within and/or included in an image submitted as part of real-world environment information 212) that were inliers during the relocalization process.

Proceeding to FIG. 14, listing 1400 includes a client-facing interface to a relocalization service as described herein. As described above, a relocalization service may use a predefined and/or pre-generated map of a real-world environment and/or predefined anchor points within the pre-generated map to relocalize a client device (e.g., client device 202) into a real-world environment (e.g., real-world environment 210). The map and/or the logic of the relocalization process may be intentionally unavailable to the client, the client-facing interface may be intentionally compact.

As shown in listing 1400, class 1402 includes two functions, which may utilize many of the data structures described in reference to FIG. 13. Member function relocalize accepts a reference to a RelocalizationQuery object (e.g., data structure 1308) named query and returns a RelocalizationResponse object (e.g., a data structure 1312). Member function prior accepts a reference to a RelocalizationQuery data object (e.g., data structure 1308) named query and a reference to a RelocalizationPrior data object (e.g., 1310) named prior. A client may call this function when the client wishes to bypass a coarse map search and/or has information from a previous relocalization.

Figure 15:

FIG. 15 includes listing 1500 that may include various definitions, data structures, data objects, classes, and so forth that may be included in an API for an asset management service as described herein.

Code block 1502 includes type aliases ARObjectID and ARTrackableID for unsigned 64-bit integers. Hence, variables of type ARObjectID and/or ARTrackableID may be defined as and/or may include 64-bit unsigned integers.

Data structure 1504 may describe a relative transformation from an anchor point position to an object. Data structure 1504 is named ARObjectTransformation and includes three data members. Data member parent_trackable_id is of type ARTrackableID (e.g., an unsigned 64-bit integer) and may represent an identifier for an anchor point. Data member T_obj_trackable is of type SE3d and may represent a transformation from a position of a virtual object (e.g., digital asset 224) to the mapped position of the anchor point identified by parent_trackable_id, or vice versa. Data member scale is of type double and may indicate a scale associated with the transformation and/or the virtual object.

Data structure 1506 may represent a relative transformation from a current (i.e., source) anchor point to a target anchor point. Data structure 1504 is named ARTrackableEdge and may include ARTrackableID target_trackable_id, which may indicate an identifier for a target anchor point, and SE3d T_source_target, which may represent a relative transformation from a current (i.e., source) anchor point to the target anchor point identified by target_trackable_id.

Data structure 1508 has a name of ARObject and may describe and/or include information associated with a virtual object. Data member id has a type of ARObjectID and may include an identifier associated with a virtual object. Data member parent_trackable_transforms is a vector of ARObjectTransformation data objects and may represent relative transformations to/from the virtual object identified by ARObjectID id to/from one or more anchor points. Data member metadata has a type of Metadata and may include any other suitable information associated with the virtual object (e.g., a model associated with the virtual object, a type of the virtual object, a privacy designation associated with the virtual object, etc.).

Data structure 1510 has a name of ARTrackable and may represent and/or include data associated with an anchor point. Data member id has a type of ARTrackableID and may include an identifier associated with an anchor point. Data member neighbors has a vector data type and includes ARTrackableEdge data objects. Data member neighbors may describe edges (e.g., graph edges) that indicate relationships (e.g., transformations) between the anchor point identified by ARTrackableID id and other anchor points included in a map of a real-world environment. As noted above, anchor points included in a map of a real-world environment may be stored, referenced, structured, conceptualized etc. as a connected graph, with anchor points as nodes of the graph and relative transformations between anchor points as edges of the graph. Data member attached_objects includes a vector of ARObject data objects and may indicate one or more virtual objects that may be "attached to" the anchor point identified by ARTrackableID id.

Data structure 1512 has a name of InsertARObjectRequest and may represent a request to insert a virtual object asset into a collection of virtual objects (e.g., asset data 144). Data member T_obj_trackable has a data type of SE3d and may indicate a 6DoF relation to a particular anchor point, identified by ARTrackableID trackable_id. Data member scale is of type double and may indicate a scale associated with the transformation and/or the virtual object. Data member metadata has a type of Metadata and may include any other suitable information associated with the virtual object (e.g., a model associated with the virtual object, a type of the virtual object, a privacy designation associated with the virtual object, etc.).

Data structure 1514 has a name of InsertARObjectResponse and may represent a server response from an asset management server (e.g., AMS server 208) in response to a request to insert a virtual object into a collection of virtual objects (e.g., a request in a form like that of data structure 1512). Boolean value success may indicate a success or failure of a request to insert a virtual object. Data member ARObjectID may be an identifier that may be assigned to a successfully inserted virtual object.

Data structure 1516 has a name of FetchARObjectRequest and may represent a request, given a client's current location, for all visible virtual objects that the client has access to. Data member trackable_id is of data type ARTrackableID and may represent an identifier associated with an anchor point. Data member T_you_trackable is of type SE3d and may represent a relative translation from a position of a client device within a real-world environment to a position of the anchor point identified by ARTrackableID trackable_id. Data member metadata has a type of Metadata and may include any other suitable information associated with the request.

Data structure 1518 has a name of FetchARObjectResponse and may represent a response to a request for all visible virtual objects that a client has access to, given the client's current location (e.g., a request in a form like that of data structure 1516). Boolean value success may indicate a success or failure of a request for visible virtual objects. Data member visible_objects may include a vector of ARObject data objects that an asset management service (e.g., AMS server 208) may return to a client device (e.g., client device 202) in response to the request.

As discussed throughout the instant disclosure, the disclosed systems and methods may provide one or more advantages over traditional options for presenting digital assets within artificial environments. For example, as described above, the relocalization service (e.g., RLS server 206), asset management service (e.g., AMS server 208), and the front end (e.g., client device 202) may be loosely coupled. Indeed, in some embodiments, the relocalization service (e.g., RLS server 206) and/or the asset management service (e.g., AMS server 208) may maintain little to no information regarding a particular client device and may communicate with each other substantially via anchor point identifiers (e.g., anchor point identifiers received by client devices from the relocalization service and sent to the asset management service by the client devices). This loose coupling may enable each component (e.g., relocalization service, asset management service, and client front end) to operate and/or develop independently of the others.

In addition, as the relocalization service, asset management service, and client front end may be loosely coupled, the relocalization service and/or asset management service may be platform-agnostic and may therefore provide relocalization and/or asset management services to any suitable front-end client executing any suitable AR platform.

Furthermore, the systems and methods described herein may provide increased flexibility when compared with traditional AR systems. For example, the relocalization service and/or asset management service may serve multiple types of applications in addition to augmented reality applications, such as any service that may provide efficient delivery of location-relevant data to client devices. By way of illustration, once a client device has been relocalized within a real-world environment, a user and/or computing system may request, and the asset management service may deliver to the client device, any data relevant to the location of the client device.

Additionally, the systems and methods described herein may further conserve bandwidth resources, efficiently utilize computing resources of a client device, and/or facilitate and/or enhance user privacy. For example, as described above, some embodiments of the systems and methods described herein may cause a client device to extract feature descriptors and/or generate feature rays from a captured raw image and may cause the client device to transmit these feature descriptors and/or feature rays to the relocalization service instead of raw image data. This may conserve bandwidth resources, as feature descriptors and/or feature rays may require much less bandwidth to transmit than raw images. Additionally, such embodiments may efficiently utilize computing resources of the client device and/or may conserve computing resources of the relocalization service, as the relocalization service may be relieved from performing feature extraction and/or feature ray generation operations as part of a relocalization process.

Moreover, in some embodiments, the systems and methods described herein may enhance user security and/or privacy. Original image data may be difficult or impossible to reconstruct from extracted feature descriptors and/or feature rays. Therefore, transmitting extracted feature descriptors and/or feature rays to a relocalization service instead of raw image data may effectively protect sensitive and/or private information included in the raw image data from unintentional disclosure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive information representative of a real-world environment (e.g., image data) to be transformed, transform the information representative of the real-world environment, output a result of the transformation to determine a position of a client device within a real-world environment, use the result of the transformation to determine a location of the client device within the real-world environment, and may store the result of the transformation to present a digital asset within an artificial environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" and/or "non-transitory computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
acquiring, via a client device within a real-world environment, information representative of the real-world environment by directing the client device to:
capture, via an imaging device included in the client device, an image of a portion of the real-world environment;
detect, via a feature detection algorithm, an image feature included in the image;
identify, by the client device via a pinhole camera model, a feature ray associated with the imaging device and the detected image feature; and
include the feature ray in the information representative of the real-world environment;
transmitting the information representative of the real-world environment to a relocalization service that relocalizes the client device within the real-world environment based at least on the feature ray;
receiving, from the relocalization service in response to the information representative of the real-world environment:
information associated with an anchor point comprising a mapped position within the real-world environment; and
a determined position within the real-world environment of the client device relative to the mapped position of the anchor point;
sending a query comprising an identifier associated with the anchor point to an asset management service;
obtaining, from the asset management service in response to the query, information representative of at least one digital asset; and
presenting the digital asset at a position within an artificial environment relative to the determined position of the client device within the real-world environment and the mapped position of the anchor point.

2. The computer-implemented method of claim 1, wherein acquiring the information representative of the real-world environment further comprises:
capturing, via an imaging device included in the client device, an image of at least a portion of the real-world environment; and
detecting an orientation of the imaging device at a time of capturing the image of the portion of the real-world environment.

3. The computer-implemented method of claim 2, wherein acquiring the information representative of the real-world environment further comprises adjusting the image by reducing an effect of an intrinsic parameter of the imaging device on the image.

4. The computer-implemented method of claim 3, wherein the intrinsic parameter comprises at least one of:
a focal length of the imaging device;
a principal point of the imaging device; or a skew coefficient of the imaging device.

5. The computer-implemented method of claim 2, wherein acquiring the information representative of the real-world environment further comprises:
generating a feature descriptor based on the image feature included in the image; and
including the feature descriptor as at least part of the information representative of the real-world environment.

6. The computer-implemented method of claim 5, wherein:
acquiring the information representative of the real-world environment further comprises identifying the feature ray further based on the orientation of the imaging device at the time of capturing the image; and
the feature ray comprises:
an origin at a point associated with the imaging device; and
a direction that causes the feature ray to intersect with the image feature.

7. The computer-implemented method of claim 1, wherein the information representative of the real-world environment comprises at least one of:
an image of at least a portion of the real-world environment captured by an imaging device included in the client device;
an orientation of the imaging device at a time of capturing the image by the imaging device;
an intrinsic parameter of the imaging device;
an image feature included in the image; or
a feature descriptor based on the image feature included in the image.

8. The computer-implemented method of claim 7, wherein the information representative of the real-world environment further comprises at least one of:
a previously determined position of the client device relative to at least one mapped position within the real-world environment;
a confidence level associated with the previously determined position of the client device;
a global positioning system (GPS) coordinate associated with the client device; or
a network identifier associated with the real-world environment.

9. The computer-implemented method of claim 1, wherein:
the method further comprises tracking a motion of the client device within the real-world environment; and
updating the determined position within the real-world environment of the client device based on the motion of the client device within the real-world environment.

10. The computer-implemented method of claim 9, wherein tracking the motion of the client device within the real-world environment comprises:
determining, at a time of transmitting the information representative of the real-world environment to the relocalization service, an initial position of the client device within the real-world environment;
generating an additional anchor point that corresponds to the initial position; and
tracking the motion of the client device within the real-world environment relative to the additional anchor point.

11. The computer-implemented method of claim 1, further comprising:
determining a coarse position of the client device based on a part of the information representative of the real-world environment;
identifying a fine position of the client device based on the coarse position and an additional part of the information representative of the real-world environment; and
selecting the anchor point based on the fine position of the client device.

12. A system comprising:
an acquiring module, stored in memory, that acquires, via a client device within a real-world environment, information representative of the real-world environment by directing the client device to:
  capture, via an imaging device included in the client device, an image of a portion of the real-world environment;
  detect, via a feature detection algorithm, an image feature included in the image;
  identify, via a pinhole camera model, a feature ray associated with the imaging device and the detected image feature; and
  include the feature ray in the information representative of the real-world environment;
a transmitting module, stored in memory, that transmits the information representative of the real-world environment to a relocalization service that relocalizes the client device within the real-world environment based at least on the feature ray;
a receiving module, stored in memory, that receives, from the relocalization service in response to the information representative of the real-world environment:
information associated with an anchor point comprising a mapped position within the real-world environment; and
a determined position within the real-world environment of the client device relative to the mapped position of the anchor point;
a sending module, stored in memory, that sends a query comprising an identifier associated with the anchor point to an asset management service;
an obtaining module, stored in memory, that obtains, from the asset management service in response to the query, information representative of at least one digital asset;
a presenting module, stored in memory, that presents the digital asset at a position within an artificial environment relative to the determined position of the client device within the real-world environment and the mapped position of the anchor point; and
at least one physical processor that executes the acquiring module, the transmitting module, the receiving module, the sending module, the obtaining module, and the presenting module.

13. The system of claim 12, wherein the acquiring module acquires the information representative of the real-world environment by detecting an orientation of the imaging device at a time of capturing the image of the portion of the real- world environment.

14. The system of claim 13, wherein the acquiring module further acquires the information representative of the real-world environment by adjusting the image by reducing an effect of an intrinsic parameter of the imaging device on the image.

15. The system of claim 13, wherein the acquiring module further acquires the information representative of the real-world environment by:
  generating a feature descriptor based on the image feature included in the image; and
  including the feature descriptor as at least part of the information representative of the real-world environment.

16. The system of claim 15, wherein the feature ray comprises:
  an origin at a point associated with the imaging device; and
  a direction that causes the feature ray to intersect with the image feature.

17. The system of claim 12, wherein:
the system further comprises a tracking module, stored in memory, that:
  tracks a motion of the client device within the real-world environment; and
  updates the determined position within the real-world environment of the client device based on the motion of the client device within the real-world environment; and
the physical processor further executes the tracking module.

18. The system of claim 17, wherein the tracking module tracks the motion of the client device within the real-world environment by:
  determining, at a time of transmitting the information representative of the real-world environment to the relocalization service, an initial position of the client device within the real- world environment;
  generating an additional anchor point that corresponds to the initial position; and
  tracking the motion of the client device within the real-world environment relative to the additional anchor point.

19. The system of claim 12, wherein:
the system further comprises a positioning module, stored in memory, that:
  determines a coarse position of the client device based on a part of the information representative of the real-world environment;
  identifies a fine position of the client device based on the coarse position and an additional part of the information representative of the real-world environment; and
  selects the anchor point based on the fine position of the client device; and
the physical processor further executes the positioning module.

20. A non-transitory computer-readable medium comprising computer-readable instructions that, when executed by at least one processor of a computing system, cause the computing system to:
  acquire, via a client device within a real-world environment, information representative of the real-world environment by directing the client device to:
    capture, via an imaging device included in the client device, an image of a portion of the real-world environment;
    detect, via a feature detection algorithm, an image feature included in the image;
    identify, via a pinhole camera model, a feature ray associated with the imaging device and the detected image feature; and
    include the feature ray in the information representative of the real-world environment;
  transmit the information representative of the real-world environment to a relocalization service that relocalizes the client device within the real-world environment based at least on the feature ray;
  receive, from the relocalization service in response to the information representative of the real-world environment:
  information associated with an anchor point comprising a mapped position within the real-world environment; and
  a determined position within the real-world environment of the client device relative to the mapped position of the anchor point;

send a query comprising an identifier associated with the anchor point to an asset management service;

obtain, from the asset management service in response to the query, information representative of at least one digital asset; and present the digital asset at a position within an artificial environment relative to the determined position of the client device within the real-world environment and the mapped position of the anchor point.

* * * * *